US010272458B2

(12) United States Patent
Taube et al.

(10) Patent No.: US 10,272,458 B2
(45) Date of Patent: Apr. 30, 2019

(54) LIQUID DISTRIBUTION SYSTEM AND METHOD

(71) Applicant: J&R DESIGN SYSTEMS, INC., Bloomfield Hills, MI (US)

(72) Inventors: Frank Taube, Bloomfield Hills, MI (US); Chris Schweizer, Bloomfield Hills, MI (US)

(73) Assignee: J&R Design Systems, Inc., Bloomfield Hills, MI (US)

( * ) Notice: Subject to any disclaimer, the term of this patent is extended or adjusted under 35 U.S.C. 154(b) by 15 days.

(21) Appl. No.: 15/394,078

(22) Filed: Dec. 29, 2016

(65) Prior Publication Data

US 2017/0197224 A1 Jul. 13, 2017

Related U.S. Application Data

(60) Provisional application No. 62/276,385, filed on Jan. 8, 2016.

(51) Int. Cl.
| | | |
|---|---|---|
| *B05B 12/14* | (2006.01) | |
| *B05D 1/02* | (2006.01) | |
| *F16L 55/46* | (2006.01) | |
| *B05B 9/04* | (2006.01) | |
| *F16L 101/12* | (2006.01) | |

(52) U.S. Cl.
CPC .......... *B05B 9/0423* (2013.01); *B05B 12/149* (2013.01); *B05D 1/02* (2013.01); *F16L 55/46* (2013.01); *F16L 2101/12* (2013.01)

(58) Field of Classification Search
CPC .. B05B 12/149; B05B 9/0423; F16L 2101/12; F16L 55/46

USPC ....................................................... 427/421.1
See application file for complete search history.

(56) References Cited

U.S. PATENT DOCUMENTS

| | | | |
|---|---|---|---|
| 4,030,857 A | 6/1977 | Smith, Jr. | |
| 4,238,073 A | 12/1980 | Liska | |
| 4,390,126 A | 6/1983 | Buchholz et al. | |
| 5,223,306 A | 6/1993 | Bartow | |
| 5,433,587 A | 7/1995 | Bankert et al. | |
| 7,293,720 B2 * | 11/2007 | Ramsay | .................. B05B 9/035 118/313 |

(Continued)

FOREIGN PATENT DOCUMENTS

EP 1172152 B1 8/2003

*Primary Examiner* — Alexander M Weddle
(74) *Attorney, Agent, or Firm* — Ohlandt, Greeley, Ruggiero & Perle, L.L.P.

(57) ABSTRACT

A liquid (e.g., paint) distribution system comprising: at least one liquid reservoir; at least one liquid exchange assembly, wherein the liquid exchange assembly comprises at least one liquid exchange module; a plurality of liquid circulation lines disposed between the liquid reservoir and at least one liquid exchange module, wherein each the liquid circulation line supplies at least one liquid to the liquid exchange module; at least one liquid change valve module; and at least one liquid supply line in fluid communication between the liquid exchange module and the liquid change valve module. The liquid exchange module is configured such that the number of the liquid supply lines in fluid communication between the liquid exchange module and the liquid change valve module is less than the number of liquid circulation lines from the liquid reservoir to the liquid exchange module.

25 Claims, 13 Drawing Sheets

(56) References Cited

U.S. PATENT DOCUMENTS

| | | |
|---|---|---|
| 8,359,726 B2 | 1/2013 | Ansorge |
| 8,496,024 B2 | 7/2013 | Jones |
| 2002/0166899 A1* | 11/2002 | Van der Steur ....... B05B 12/149 239/125 |
| 2004/0089234 A1 | 5/2004 | Hagglund et al. |

* cited by examiner

LIQUID DISTRIBUTION SYSTEM AND METHOD

RELATED APPLICATION

This application claims the benefit of U.S. Provisional Application Ser. No. 62/276,385, filed on Jan. 8, 2016, which is incorporated herein by reference.

BACKGROUND OF THE DISCLOSURE

1. Field of the Disclosure

This disclosure relates to liquid distribution (e.g., circulation) systems, particularly to paint distribution (e.g., circulation) systems, and more particularly to automobile paint distribution (e.g., circulation) systems.

2. Description of the Related Art

The automobile industry uses highly automated and complex painting systems. A typical automobile plant is capable of painting multiple automobile body frames concurrently and consecutively with various paints as well as primers and protective coats. More than twenty (20) different colors may be used. The painting process needs to be efficient, reliable and of high quality. This requires a complex paint distribution/recirculation system that includes multiple paint reservoirs, pumps, filtration, long piping, color change stations with valves, hose assemblies going to spray stations and robot arms and elaborate computerized control system to choose and draw specific colors and amounts. Typical paint systems are described, for example, in U.S. Pat. Nos. 4,706,885, 5,223,306 and 7,293,720).

In addition to the paint distribution function, newer systems incorporate a pig launching and receiving capability. These "piggable" pipes and hoses allow efficient cleaning of the pipes. Piggable pipes are described, for example, in EP 1172152.

A typical paint distribution system is shown in FIG. 1. Generally, different color paints are stored in individual reservoirs 102 and day tanks 104 in a room (called mix room) away from the spray booths or stations. The main reason to keep the mix room away from the spray stations is that many paints are solvent based and flammable. Mix rooms are designed as explosion proof and rated Class 1/Division 1 areas with stringent restrictions based on safety and environmental needs. This need necessitates long piping network from the tanks to the spray stations. Each tank generally has one (1) supply line and a return line. The two (2) pipe design (one supply line and one return line) is the most commonly used in the industry (see, for example, U.S. Pat. No. 4,706,885). Older technologies used a three (3) pipe (1 supply line and 2 return lines) design but had too many issues.

FIG. 1 shows a typical paint distribution system for one (1) color and two (2) parallel booths working simultaneously (i.e., two base coats #1 and #2) with each booth having eight (8) color change valves 114 for a total of 16 color change valves 114 at each spray robot arms 112. The supply line 106 may include a heat exchange to control the paint temperature and the supply lines and return lines, may also include flow meters to measure the return flow rate. The paint is continuously circulated from and back to the tank 104. As stated, there are many drops at the spray booths, where paint is drawn from the supply line whenever needed. From the supply line 106, thru the valves 108, paint is drawn as needed by the hoses 110. Thus multiple tubes and hoses run from the supply line to the robot's color change valves (CCV) at 114. Since a typical automobile plant can use more than twenty (20) colors, the paint distribution system can get quite complicated.

A typical robot spray station drop design is shown in FIG. 2. This is for six (6) colors only. But as stated before, more than twenty (20) colors are typically used. The supply lines and return lines, totally twelve (12), one (1) supply and return the six (6) colors from and to the tanks 102 and 104. The tubing 202 is graduated in size to maintain a minimum fluid velocity in the tubes. This tubing is generally stainless steel. There is a spray station paint box 204 where each color is brought in using a spray station drop tubing 206, and returned via a return tube for each color. The spray station drop tubing 206 also includes ball valves 208 for paint isolation purposes. From the ball valves 208, two (2) hoses (one supply and one return) for each color then goes to the robot color change assembly 210. Thus, FIG. 2 shows a total of twelve (12) robot paint supply and return hoses 212, two (one supply and one return) for each color. FIG. 2 also shows six (6) color change valves (CCV) at 214.

Thus, the function of the paint distribution system is to supply paint from tanks 102 and 104 to robot color change assembly 210 reliably so that the robots can paint the auto bodies with high quality, high yield and at a rapid pace. To accomplish this with the current design is not an easy task. There are many requirements and considerations, for example, more than twenty (20) colored paints must be circulated and travel very long distances around the clock; paint applicator equipment requires a specified fluid pressure in order to spray the paint; the lines also require a minimum fluid velocity; the paints can have variable paint viscosities, and the design must accommodate these variable viscosities; and the paint material integrity must be maintained.

Color is very important for automobile customers. Certain colors are very popular and others are not. But all are still needed. While popular colors are used a lot in the paint distribution system, other colors are still needed. These non-popular colors still need circulation through the tubing. Because of their low usage, they have a much longer residence time in the system. These low usage colors or paints are vulnerable to what is termed as "shear degradation" that causes the color of the paint to shift. The high shear stress can cause pigments and flakes in metal paints to degrade over time with significant quality issues. See, for example, a paper by Peter Bankert of Graco at the "Finishing" conference and Exposition Cincinnati Ohio 1993 October Proceedings).

In addition to all the issues created by the current paint distribution designs, paint manufacturers are supplying paints over a wide range of viscosities. Viscosity specifications for the various different colored paints vary a lot resulting in a variety of viscosities and shear rates. FIG. 3 shows normalized viscosity versus normalized shear rate graphs for four (4) typical paints. One can clearly see a significant variation in the paint viscosities. Paint distribution system designers are challenged with designing pumps, valves and piping to satisfy a range of viscosities. It is known that higher paint viscosities require higher pump pressures and vice versa. This creates other issues like shear degradation and may even result in aggregation of paint particles or clogging. This will cause defects on the automotive vehicles and could require work stoppage and intensive cleaning of the plugged hoses and pipes.

As indicated, all the tubing and hosing for the current paint distribution systems is quite long. Even the drops in the spray station box are quite a distance away from each other. The current paint distribution systems must provide minimum required fluid pressure at all drops. As the paint flows through the tubing, the friction naturally causes a pressure drop. This pressure drop must be accounted for in order to satisfy the pressure specification for the robot color change assembly 210. The pressure drop is calculated by the following formula:

$$\text{Delta } P = A^*(QVL/D^4)$$

where Delta P (psi) is pressure change, Q (gpm) is flow rate of the paint, V (poise) is viscosity, L (feet) is length of the pipe, D (inch) is inside diameter of the pipe, and A is constant.

For example, if the drop points are one hundred (100) feet apart and Q is 2 gpm, V is 1 poise, D is 1 inch and A is 0.0273, then Delta P is 5.46 psi.

Because the current paint distribution system pipes can be several hundred feet long, significant pressure loss is expected. So the supply line fluid pressure must be significantly higher than the required fluid pressure at the color change assemblies. This requires different pump specifications for all the lines.

The pressure drop is directly related to paint viscosities. FIG. 3 shows that different paint colors have varying paint viscosities. This means each color line will have different Delta P requiring wide range of pump pressures.

Paint velocity is another important consideration. The paint must maintain a certain velocity in all the pipes and hoses. If the velocity is low, then the paint will settle causing cosmetic quality issues on the automobile body. Settling can also lead to clogged lines over time. To maintain velocity, "graduated" pipe sizes are required that are designed to system requirements.

If the velocity is too high, then it can lead to shear degradation issues. Shear can be looked at as to how many turns of paint can be accomplished through the paint distribution system without seeing a color degradation. About one thousand (1000) turns is a good design number. If the system design requires higher fluid pressure and high fluid flow rates, then it will cause high shear points and thus reduced number of paint turns.

The current paint distribution designs must address many issues including: paint shear/degradation (e.g., varying system flow rates, supply and return pressures); paint viscosities (e.g., wide range of paint viscosities requiring high supply pressures and challenge to meet velocity demands throughout the paint distribution system); cartridge/spray station pressure (e.g., must meet the minimum pressure limit and not to exceed the maximum pressure); system balancing with a minimum circulation velocity (e.g., fluid pressure and fluid flow requirements not consistent due to paint shear and paint viscosity differences); large number of hoses needed (e.g., each color requires two (2) hoses so twenty-four (24) colors require forty-eight (48) hoses, and this requires hose bundling and stresses Cat Track capacity in the paint robots); ability to add more colors because of all the above; plugging at the spray station drops; material build up and settling in the lines; and time and resources needed to flushing and cleaning the system.

These issues result in serious yield, quality and cost disadvantages for the automobile industry.

Accordingly, there is a need for improved paint distribution systems, particularly suited for automotive paint distribution lines. There is a need for improved paint distribution systems having a design that offers a significant reduction of paint circulation tubing, including tubes and valves to the color change assembly stations and paint application device; eliminates the need for graduated piping at the spray booths; and can accommodate piggable hoses and pipes. In addition, there is a need for improved paint distribution systems that have lower supply and return pressures, lower flow rates, reduced shear degradation of the paints, and can be used with a range of paint viscosities. Further, there is a need for improved paint distribution systems that afford yield, quality and cost advantages, in particular, for the automobile industry.

The present disclosure provides many advantages, which shall become apparent as described below.

SUMMARY

This disclosure provides a unique paint distribution system which not only overcomes the above mentioned issues, but also offers a lower operating cost, low maintenance, efficient design, and potentially lower cost.

This disclosure provides unique liquid distribution (e.g., circulation) systems, particularly paint distribution (e.g., circulation) systems, and more particularly automobile paint distribution (e.g., circulation) system In particular, this disclosure provides a unique liquid distribution system particularly suited for automotive paint distribution lines. The system design offers a significant reduction of paint circulation tubing, including tubes and valves from one or more paint reservoirs to one or more paint exchange modules, and from one or more paint exchange modules to one or more paint color change valve modules; eliminates the need for graduated piping at the one or more paint color change valve modules; and accommodates piggable hoses and pipes. This unique design offers many benefits over the current paint circulation systems including lower supply and return pressures, lower flow rates, and reduced shear degradation of the paints. In addition, this unique design can be used with a range of paint viscosities. Further, the unique design affords yield, quality and cost advantages, in particular, for the automobile industry.

More, in particular, this disclosure relates, in part, to a unique new paint distribution system design, which moves the paint exchange assembly comprising at least one paint exchange module farther from the spray station, and significantly reduces the number of supply/return hoses required from the paint exchange module to the paint color change valve module. Pig launching/receiving assemblies are provided at the ends of these hoses to allow thorough cleaning of these hoses, which in turn allows the same lines to carry multiple colors. A secondary or backup pig may be provided as part of this new paint distribution system design to increase reliability and ease of maintenance.

This disclosure relates, in part, to a paint distribution system comprising: at least one paint reservoir; at least one paint exchange assembly, wherein the paint exchange assembly comprises at least one paint exchange module; a plurality of paint circulation lines disposed between the paint reservoir and at least one paint exchange module, wherein each paint circulation line supplies at least one colored paint to the paint exchange module; at least one paint color change valve module; and at least one paint supply line in fluid communication between the paint exchange module and the paint color change valve module. The paint exchange module is configured such that the number of the paint supply lines in fluid communication between the paint exchange module and the paint color change valve module is less than the number of paint circulation lines from the paint reservoir to the paint exchange module.

In an embodiment, the number of hoses in fluid communication between the paint exchange module and the paint color change valve module is from between about 1 to about 3. Additionally, the hose or conduit which is in fluid communication between a paint exchange module and a paint color change valve module is piggable. Further, one or more pigs per line may be provided.

This disclosure also relates in part to a method for supplying a paint for coating of a workpiece. The method comprises providing a paint distribution system comprising: at least one paint reservoir; at least one paint exchange assembly, wherein the paint exchange assembly comprises at least one paint exchange module; a plurality of paint circulation lines disposed between the paint reservoir and at least one paint exchange module, wherein each the paint circulation line supplies at least one colored paint to the paint exchange module; at least one paint color change valve module; and at least one paint supply line in fluid communication between the paint exchange module and the paint color change valve module. The paint exchange module is configured such that the number of the paint supply lines in fluid communication between the paint exchange module and the paint color change valve module is less than the number of paint circulation lines from the paint reservoir to the paint exchange module. The method further comprises circulating one or more colored paints through the paint distribution system, and coating the workpiece with the one or more colored paints.

This disclosure yet further relates in part to an integrated paint distribution system comprising a first paint distribution system integrated with a second paint distribution system. The first paint distribution system comprises: at least one paint reservoir; at least one paint exchange assembly, wherein the paint exchange assembly comprises at least one paint exchange module; a plurality of paint circulation lines disposed between the paint reservoir and at least one paint exchange module, wherein each the paint circulation line supplies at least one colored paint to the paint exchange module; at least one paint color change valve module; and at least one paint supply line in fluid communication between the paint exchange module and the paint color change valve module. For the first paint distribution system, the paint exchange module is configured such that the number of the paint supply lines in fluid communication between the paint exchange module and the paint color change valve module is less than the number of paint circulation lines from the paint reservoir to the paint exchange module. The second paint distribution system comprises: at least one paint reservoir; at least one spray station paint assembly; a plurality of paint circulation lines disposed between the paint reservoir and the spray station paint assembly; at least one paint color change assembly; and a plurality paint supply lines in fluid communication between the spray station paint assembly and the paint color change assembly. For the second paint distribution system, the at least one spray station paint assembly is configured such that the number of paint supply lines in fluid communication between the spray station paint assembly and the paint color change assembly is equal to the number of paint circulation lines from the paint reservoir to the spray station paint assembly.

This disclosure also relates, in part, to a paint exchange assembly that comprises at least one paint exchange module, wherein each paint exchange module comprises a plurality of paint exchange units, wherein each paint exchange unit comprises a housing, a paint circulation control valve (e.g., a poppet valve or pneumatic solenoid valve) and at least one fluid conduit disposed within the housing, and wherein the fluid conduits from aligned paint exchange units of each paint exchange module are in fluid communication with one another, thereby forming a single fluid chamber; at least one paint circulation line inlet in fluid communication with the fluid chamber via the paint circulation control valve; at least one pig launcher/receiver assembly having at least one pig; at least one purge material valve assembly in fluid communication with the fluid chamber; at least one compressed air valve assembly in fluid communication with the fluid chamber; at least one dump valve assembly in fluid communication with the fluid chamber; and at least one piggable paint supply hose in fluid communication with the fluid chamber and the pig launcher/receiver assembly, wherein the pig is capable of passing from the pig launcher/receiver assembly to the paint supply hose. The paint exchange assembly may have a secondary pig per line piped in place and ready for use in case of a pig failure.

In an embodiment, in the paint exchange assembly, the at least one piggable paint supply hose is in fluid communication with a piggable paint color change valve module.

This disclosure further relates in part to a liquid (e.g., paint) distribution system comprising: at least one liquid reservoir; at least one liquid exchange assembly, wherein the liquid exchange assembly comprises at least one liquid exchange module; a plurality of liquid circulation lines disposed between the liquid reservoir and at least one liquid exchange module, wherein each the liquid circulation line supplies at least one liquid to the liquid exchange module; at least one liquid change valve module; and at least one liquid supply line in fluid communication between the liquid exchange module and the liquid change valve module. The liquid exchange module is configured such that the number of the liquid supply lines in fluid communication between the liquid exchange module and the liquid change valve module is less than the number of liquid circulation lines from the liquid reservoir to the liquid exchange module.

This disclosure yet further relates in part to a method for supplying a liquid (e.g., paint). The method comprises providing a liquid distribution system comprising: at least one liquid reservoir; at least one liquid exchange assembly, wherein the liquid exchange assembly comprises at least one liquid exchange module; a plurality of liquid circulation lines disposed between the liquid reservoir and at least one liquid exchange module, wherein each the liquid circulation line supplies at least one liquid to the liquid exchange module; at least one liquid change valve module; and at least one liquid supply line in fluid communication between the liquid exchange module and the liquid change valve module. The liquid exchange module is configured such that the number of the liquid supply lines in fluid communication between the liquid exchange module and the liquid change valve module is less than the number of liquid circulation lines from the liquid reservoir to the liquid exchange module. The method further comprises circulating one or more liquids through the liquid distribution system, and utilizing the one or more liquids in the one or more liquid utilization station modules.

This disclosure also relates in part to a liquid exchange assembly that comprises at least one liquid exchange module, wherein each liquid exchange module comprises a plurality of liquid exchange units, wherein the liquid exchange unit comprises a housing, a liquid circulation control valve, and at least one fluid conduit disposed within the housing, and wherein the fluid conduits from aligned liquid exchange modules are in fluid communication with one another, thereby forming a single fluid chamber; at least one liquid circulation line inlet in fluid communication with the fluid chamber via the liquid circulation control valve; at least one pig launcher/receiver assembly having at least one or more pigs; at least one purge material valve assembly in fluid communication with the fluid chamber (e.g., the purge material may be pulsed air and solvent, or a mist of solvent created by blending air and solvent); at least one compressed air valve assembly in fluid communication with the fluid chamber; at least one dump valve assembly in fluid communication with the fluid chamber; and at least one piggable liquid supply hose in fluid communication with the fluid chamber and the pig launcher/receiver assembly, wherein the pig is capable of passing from the pig launcher/receiver assembly to the liquid supply hose. An additional secondary or back up pig may be added to the fluid communication line.

Several advantages are afforded by the paint distribution system design of this disclosure including, for example, the design reduces the number of hoses from over forty eight (48) (for twenty four (24) colors) to three (3) or less, and this reduction in number of hoses results in reduction in robot color change valves. The in line piggable exchange module design allows adding more colors without changing the paint application assembly side of the system. All hoses and spray station tubing can be piggable, including the at least one paint supply line in fluid communication between the paint exchange module and the paint color change valve module. This completely eliminates the need for graduated tubing. This also allows for the plurality of paint circulation lines 602A-C disposed between the paint reservoir and paint exchange modules 605A-C, both supply and return lines, to optionally be pigged. Also, there is a significant reduction of number/length of tubing and number of valves.

Combining the benefits from bigger size tubing and reduction in number/length of tubing and number of valves, pressure drops are significantly reduced, and paints can be circulated at lower pressures and flow rates. This means that lower supply line pressures are needed, and also lower flow rates are needed. With the paint exchange modules of this disclosure, the system does not need to be hydraulically balanced. The plurality of paint circulation lines disposed between the paint reservoir and the at least one paint exchange module, both supply and return lines, will be smaller than typical graduated two pipe systems. The flow and pressure will be lower because there is no need to overcome the restriction of a gradually smaller return line. A piggable system affords reduced settling risks, quick color change, and reduced energy costs. Lower pressures and flow rates will result in reduced shear degradation. This also means that the design in the present disclosure will accommodate paints with variety of paint viscosities and shear rates. Reduced tubing, hoses and valves will obviously translate into much reduced costs. The design will allow easy balance of the system at minimum velocity and supply pressure.

Further objects, features and advantages of the present disclosure will be understood by reference to the following drawings and detailed description.

BRIEF DESCRIPTION OF THE DRAWINGS

FIG. 9(*a*) is a top planar view of the single paint exchange unit 606A(1) of FIG. 9(*e*); FIG. 9(*b*) is a bottom planar view of the paint exchange unit 606A(1) of FIG. 9(*e*); FIG. 9(*c*) is an expanded view of chamber 905A from FIGS. 6, 9(*b*) and 9(*e*); FIG. 9(*d*) is a side perspective view of paint exchange unit 606A(1) with paint circulation control valve C1S1 and paint circulation system line 602A; FIG. 9(*f*) is an exploded view of chamber 905A with paint circulation control valve C1S1; and FIG. 9(*g*) is a cross-sectional view along line B-B of FIG. 9(*e*) showing paint circulation system line 602A and chamber 905A.

DESCRIPTION OF THE PREFERRED EMBODIMENTS

Current paint distribution designs suffer from many drawbacks as described above. The present disclosure, as shown in FIGS. 4 and 5, not only addresses these drawbacks, but also makes the overall paint distribution system compact, very efficient, flexible and potentially lower cost.

For purposes of this disclosure, paint is used broadly to include water and solvent borne paints, particularly both metallic and non-metallic paints, all of which may pass through the paint distribution system. In addition, those skilled in the art will appreciate that other paint materials may also be included in the paint distribution system of this disclosure, such as base coats, primers applied prior to the paint coat, and finishers and clear coats, which can be applied subsequent to the paint applications. The paint materials can contain binders or binder mixtures, which are present in solution in suitable solvent mixtures, as well as pigment mixture and extender mixtures.

Figure 1:
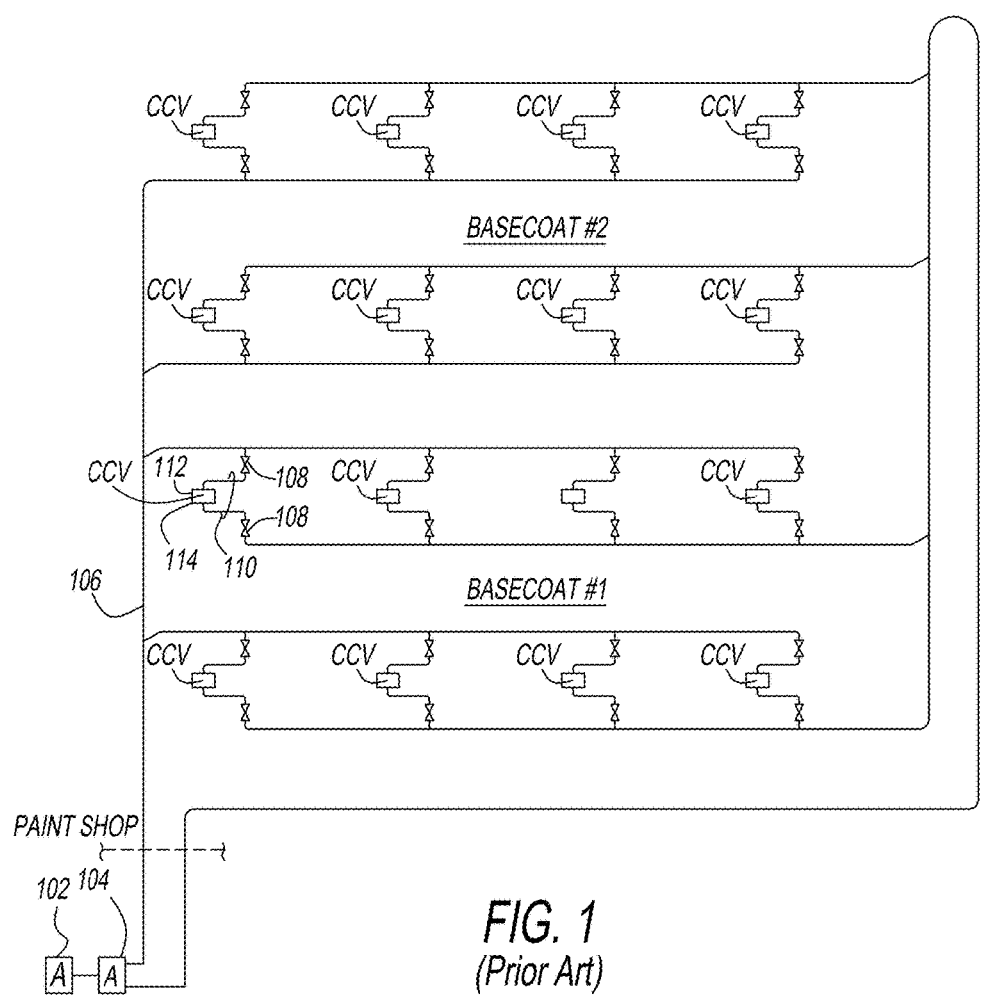
FIG. 1 depicts a prior art paint distribution system showing paint supply, the piping loops with a bundle of hoses going to and from the spray stations.
Figure 2:
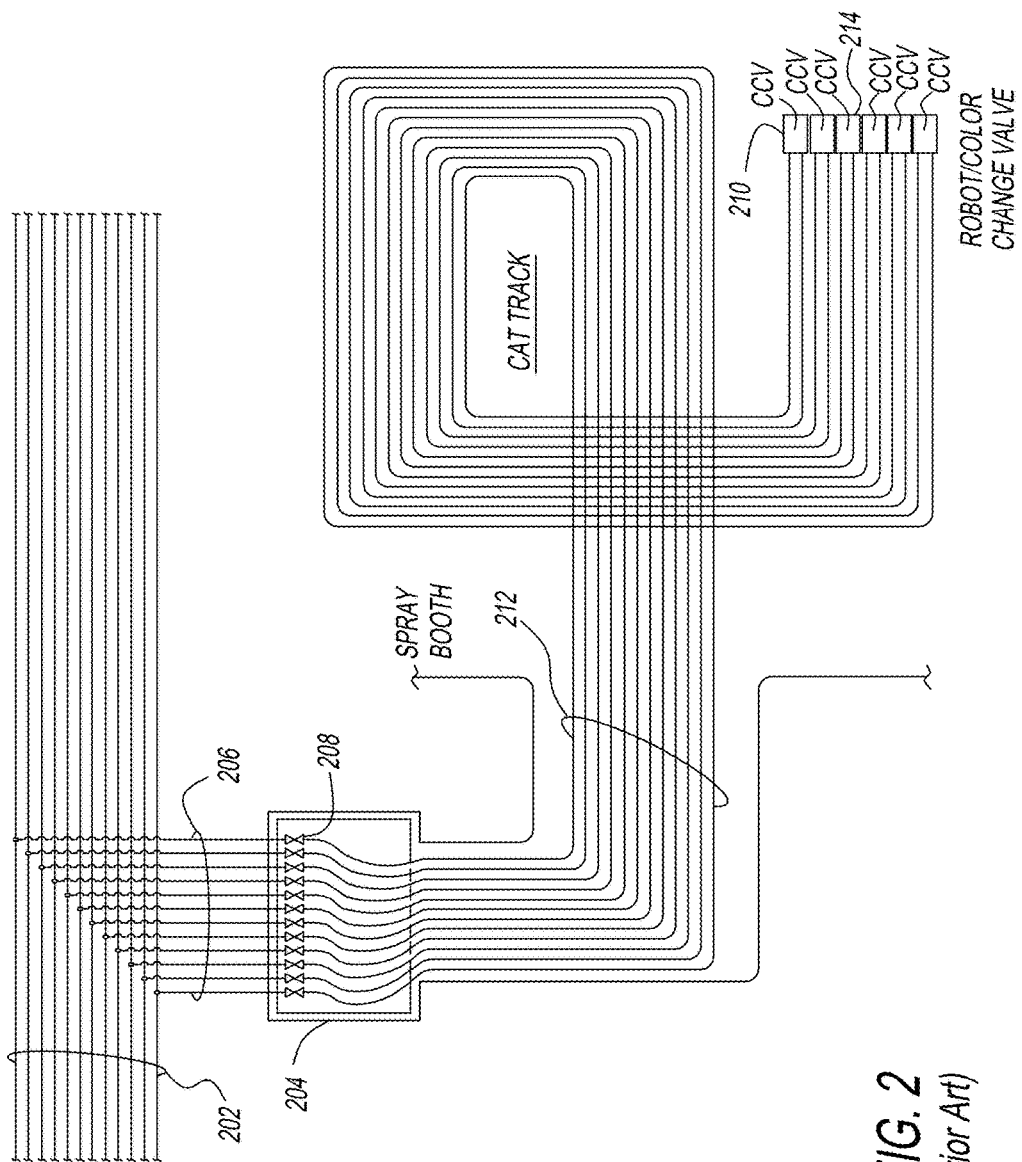
FIG. 2 depicts in detail a prior art spray station paint box and robot color change assemblies where vehicle frames are coated including "graduated" piping and pig launching/receiving assemblies.
Figure 4:
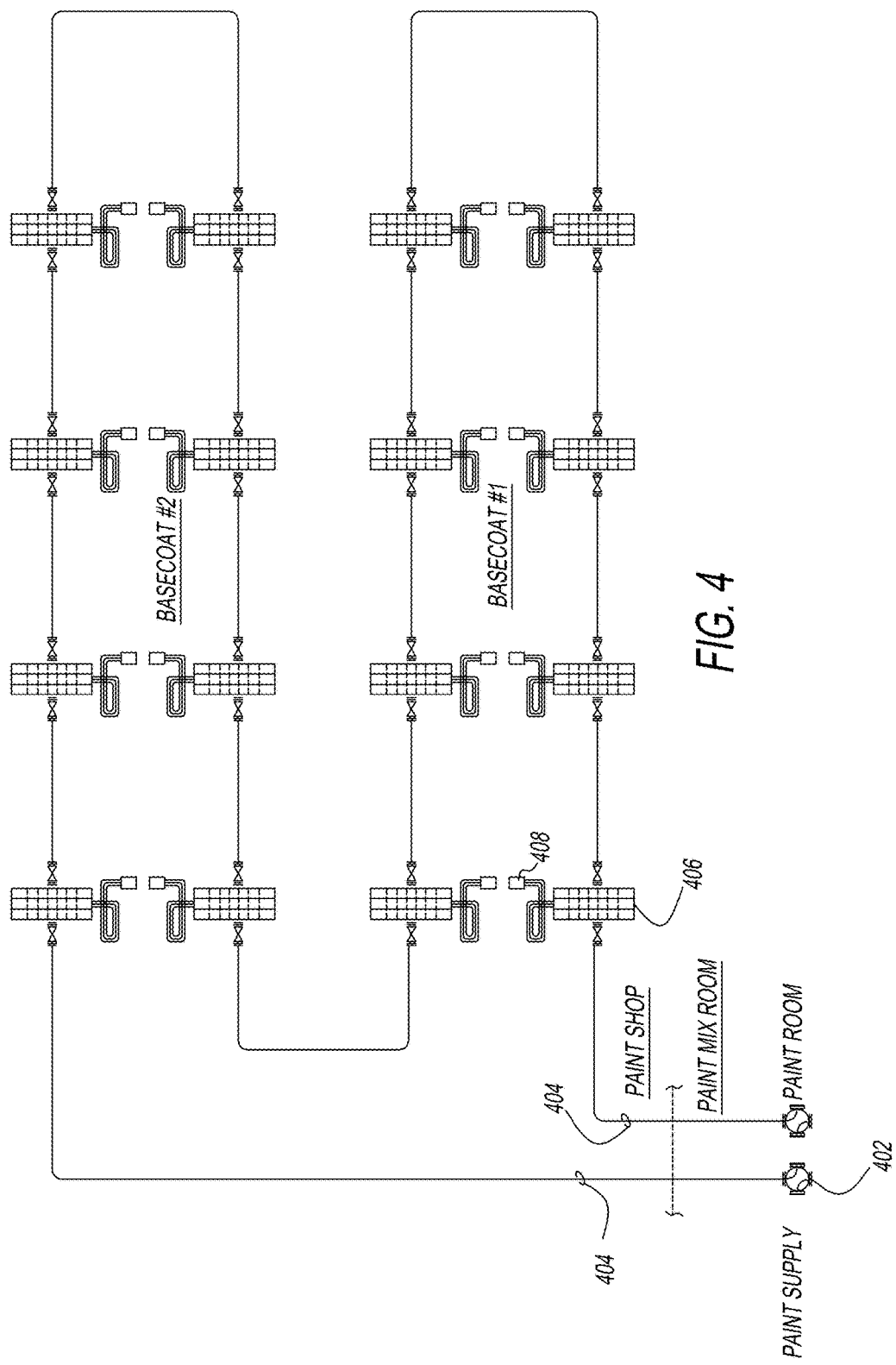
FIG. 4 depicts an illustrative basic design of the present disclosure where the paint exchange modules are removed from the paint application station assemblies, and the number of hoses between the paint exchange modules and the paint color change valve modules are reduced to three (3).
Figure 5:
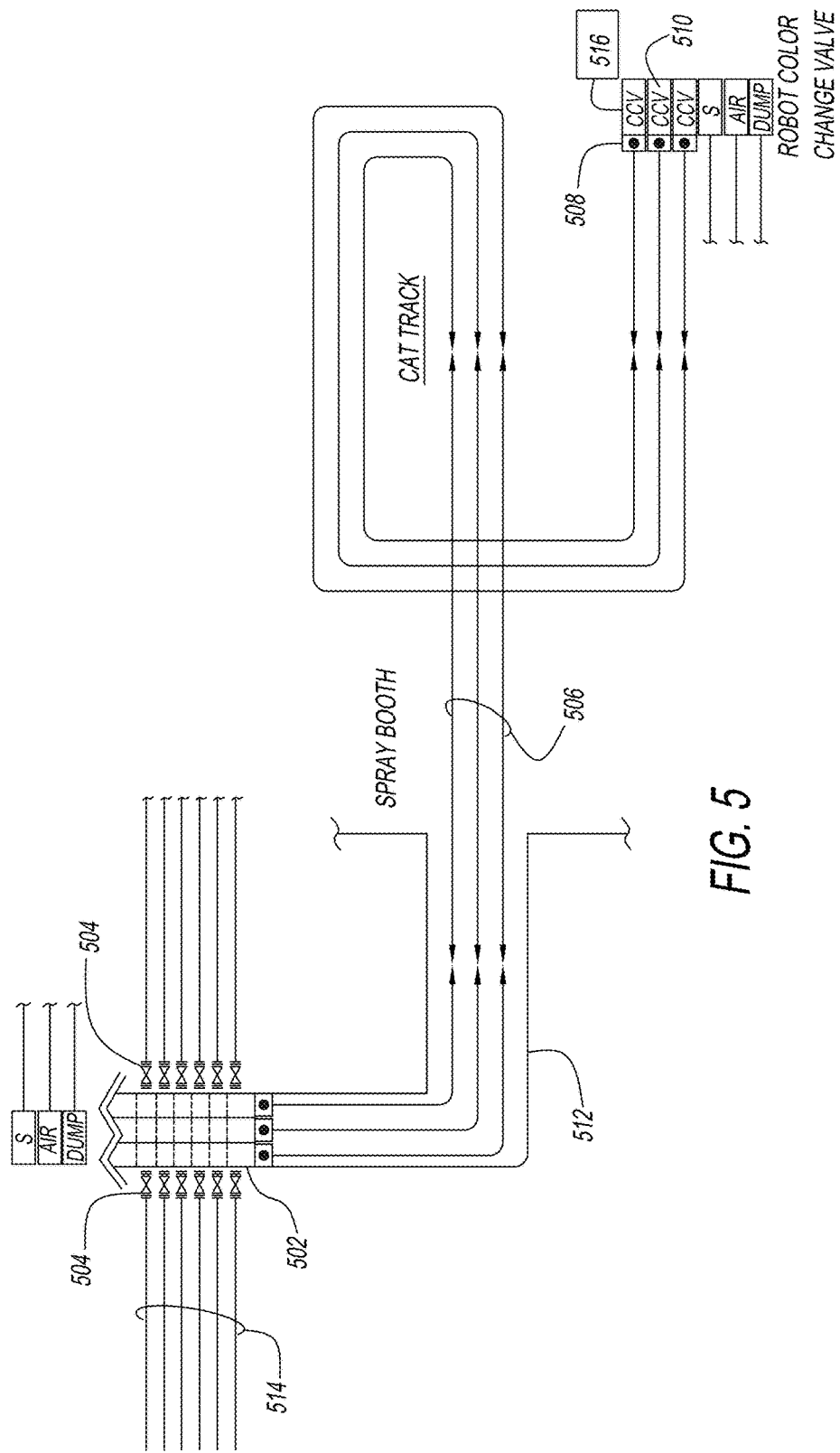
FIG. 5 depicts in detail an illustrative paint distribution system of the present disclosure including a paint exchange module, a paint color change valve module, and a paint application station assembly (e.g., robot/cartridge spray station drop).

In an embodiment, the color change assemblies or modules of the prior art (see (210) in FIG. 2), which are located at the spray applicator side (robot arm side), are designed as an in line piggable paint exchange module (see (502) in FIG. 5) in accordance with this disclosure. Although FIG. 4 is for one (1) color (direct comparison to FIG. 1) and FIG. 5 is for six (6) colors (direct comparison with FIG. 2), the present disclosure is suitable for any number of colors.

Referring to FIG. 4, the paint supply line comes from individual reservoir tanks and day tanks 402 for the main circulation tubing 404. The tubing is not graduated (unlike the prior art). The prior art designs require maintaining the supply line pressures all the way to the spray stations and the robot arms. This means the graduated pipe sizes are essential in the prior art designs. By shortening that path, the present disclosure design allows elimination of the graduated piping. As shown in FIG. 4, there are two (2) paint application station assemblies (i.e. Base Coat #1 and Base Coat #2) with eight (8) drops each of basecoat #1 or basecoat #2 for a total of sixteen (16) drops (similar to the prior art), but as described above, there exists in line piggable paint exchange modules 406 and paint color change valve modules 408 including pig launcher/receiver assemblies.

Referring to FIG. 5, robot/cartridge station drop details are shown for six (6) colors. It starts with the in line piggable paint exchange module 502 with twelve (12) pipes (one (1) supply line and one (1) return line for each color), and twelve (12) full port valves 504 for each line. Again, none of the piping is graduated. Importantly, the present disclosure design has only three (3) (or less) piggable paint hoses 506 fluidly connecting to the paint color change valve module 510 which includes the pig launcher/receiver assembly 508. The piggable hose assembly 506 is contained in a containment conduit 512.

The three (3) hose design is for a specific purpose. This design allows a continuous operation. The first hose supports the color being painted, and the second hose supports the next color to be painted. If there is a fault/failure, the third hose can replace either the first hose or the second hose. The separately designed in line piggable paint exchange module 502 allows this major reduction in the number of hoses (from twelve (12 to three (3)) in FIG. 5. Although FIG. 5 only shows six (6) colors, the same holds true for additional colors. So if the total number of colors is twenty four (24), with a total of forty eight (48) pipes 514, the present disclosure still uses only up to three (3) hoses 506. As mentioned before for efficiency purposes, the number of hoses 506 is three (3). However, in another embodiment, the number can be even two (2) or one (1).

This major reduction in the number of hoses allows similar reduction at the paint color change valve module 510 side. This makes the paint color change valve module 510 side (e.g., robot side) of the system much less complicated.

From operational perspective, paints are continuously circulated through the piping 514, through the in line piggable paint exchange module 502, then back to the tanks (individual reservoir tanks and day tanks). The paint color change valve module 510 draws the needed colors from the in line piggable exchange module 502 through the three (3) piggable paint hoses 506 as follows: the first hose is for the first color; once used in the robot arm, the next color will be drawn from the second hose; there will be some time needed to change color; and the third hose is the backup hose which can be used in case of failure or timing issue. So basically only two (2) hoses 506 and a backup hose are used to draw from six (6) colors (as shown in FIG. 5), but as many as twenty four (24) or more colors are available at the in line piggable paint exchange module 502. The hoses also recirculate the unused paint back to the in line piggable paint exchange module 502. Application of selected paints to a workpiece occurs at the paint application assembly 516 (e.g., a robot).

As described above, all the tubing and hoses are piggable in the paint distribution system of this disclosure. This affords easy cleaning and therefore easy change of colors in the same hose. In an embodiment, the hoses are contained in a leak tight conduit/pipe, cable tray or fire rated hose cover.

In an embodiment, only part of the system can be piggable. For example, certain pipes going from the tanks (going from individual reservoir tanks and day tanks) to the color exchange module (see 502 in FIG. 5) can be piggable, but there can be direct piping from the tanks to the robot assembly that is not piggable. Other piggable and non piggable line and hose combinations are also included within the scope of this disclosure.

Figure 6:
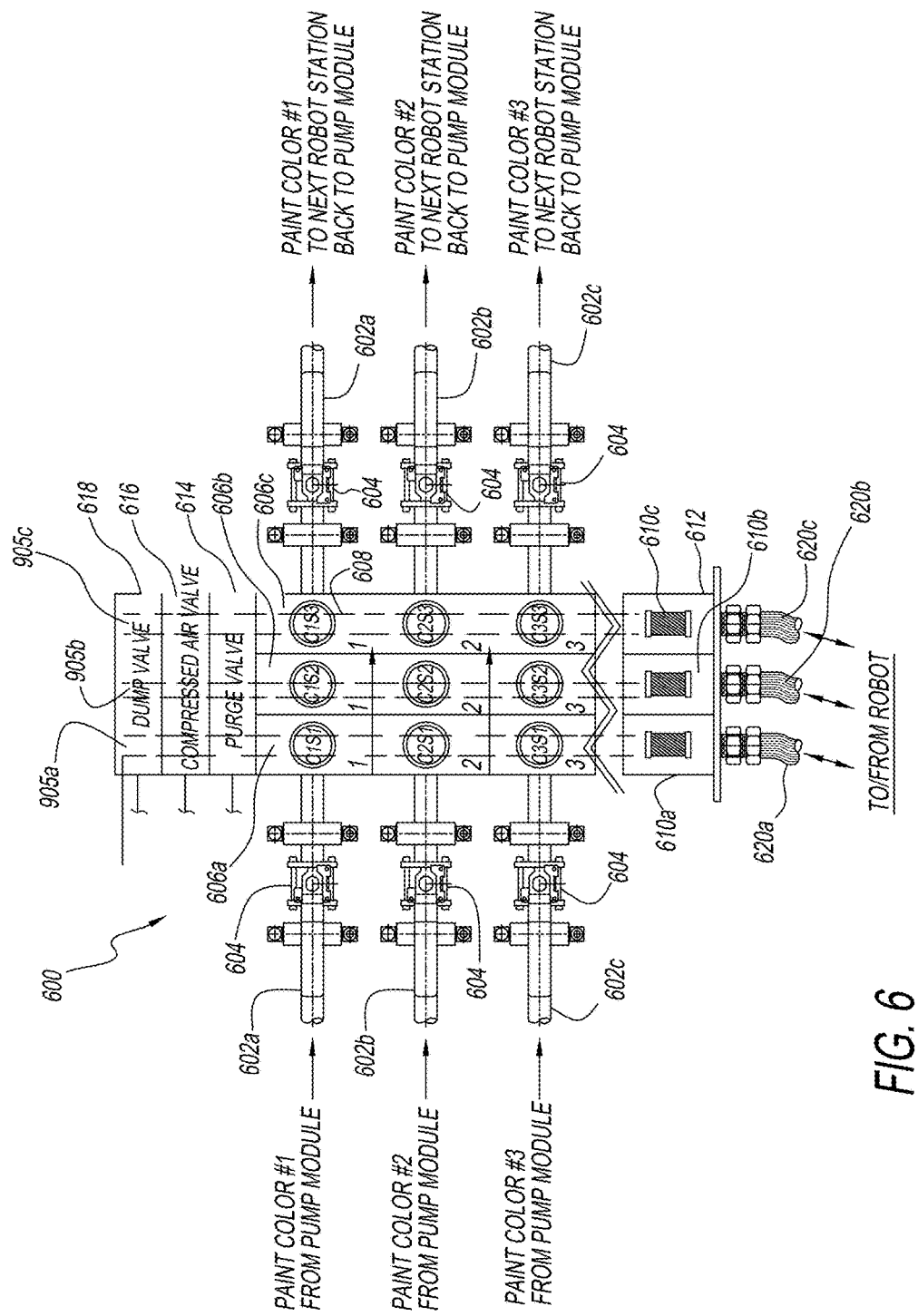
FIG. 6 depicts a paint exchange assembly having a plurality of paint exchange modules 606A, 606B and 606C for providing parallel supply paint to a robot according to the present disclosure. Each paint exchange module, e.g., 606A, 606B or 606C, includes a plurality of paint exchange units e.g., module 606A include three (3) units 606A(1), 606A(2), and 606A(3) disposed vertically one on top of the other.

An illustrative piggable paint exchange assembly 600 is shown in FIG. 6. The drawing in FIG. 6 shows three (3) colors only. The piggable paint exchange modules 606A-C include: paint circulation lines 602A-C (same as 514 in FIG. 5); full port ball valves 604; piggable paint exchange modules 606A-C including a color change valve 830; pigs 610A-C; a pig launcher/receiver assembly 612; a purge material valve assembly 614; a compressed air valve assembly 616; a dump valve assembly 618; and piggable paint supply hoses 620A-C to the robot.

This design shows that the tubing, valves and the piggable paint exchange modules 606A-C all with same inside diameter. The particular paint is selected via the piggable paint exchange module 606A-C is based on the first color needed and the next color needed. Although FIG. 6 shows only three (3) colors, this design is flexible enough to add more colors. The three (3) colors can be increased to thirty (30) colors depending on how many colors a car company wants to paint. The color changer time and line speed determine if you need parallel PEM's (i.e. A, B or ABC). After one (1) color is finished, the paint is pigged back from the robot to the appropriate paint circulation line 602A-C. Then the piggable paint supply hoses 620A-C are pigged and flushed clean via dump valve 618, compressed air valve 616 and purge valve 614. The next color is then loaded via paint exchange modules 606A-C and the cycle repeats. 606A is, for example, the primary paint exchange module, 606B is the secondary paint exchange module and 606C is a spare paint exchange module. Accordingly, after use and paint exchange module 606A is being cleaned, paint can be distributed to the robot via paint exchange module 606B. If either module 606A or 606B fails for any reason, paint exchange assembly 600 and utilized spare paint exchange module 606C in order to keep paint flowing to the robot in order to reduce or eliminate down time in the painting process.

Figure 7:
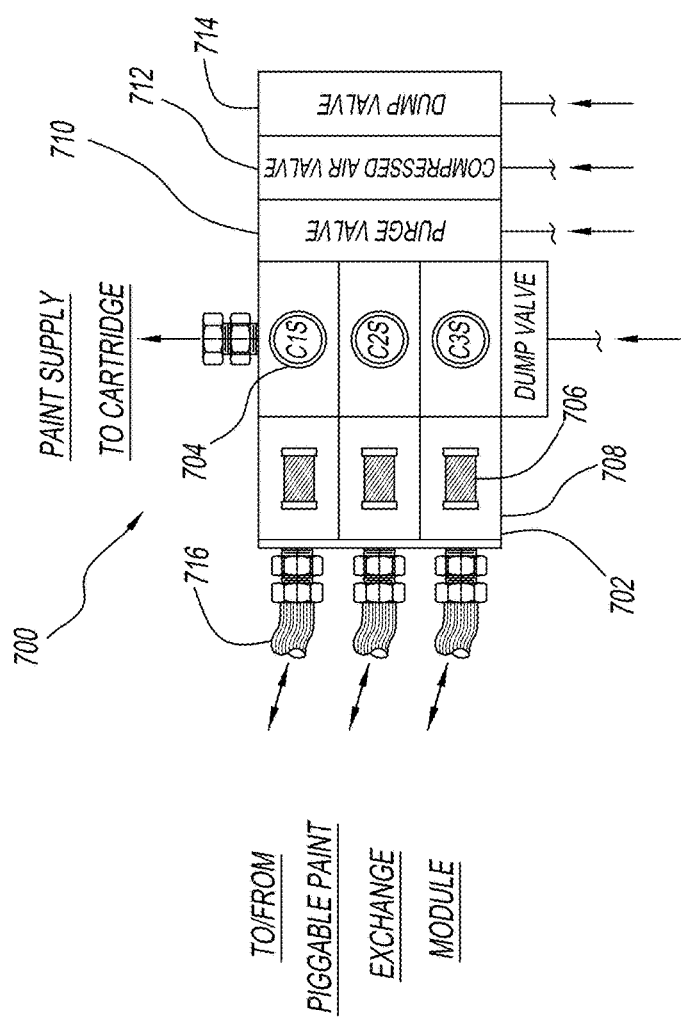
FIG. 7 depicts an illustrative paint color change valve module of this disclosure.

An illustrative paint color change valve module 700 is shown in FIG. 7. The paint color change valve module 700 includes: the main automation paint color change valve module 702 including a color change valve 704; a pig 706; a pig launcher/receiver assembly 708; a purge material valve assembly 710; a compressed air valve assembly 712; a dump valve assembly 714; and piggable paint supply hoses 716 to/from the piggable paint exchange assembly 600.

The paint color change valve module 700 shown in FIG. 7 can be utilized in both conventional and cartridge paint application systems. Some paint distribution systems use paint cartridge designs. These cartridges are placed near the paint application assemblies (e.g., robots). In order to accommodate the cartridges, in another embodiment of the present disclosure, the paint color change valve module (FIG. 7) is designed to be inserted between the piggable paint exchange assembly 700 and the cartridges, not shown.

Figure 8:
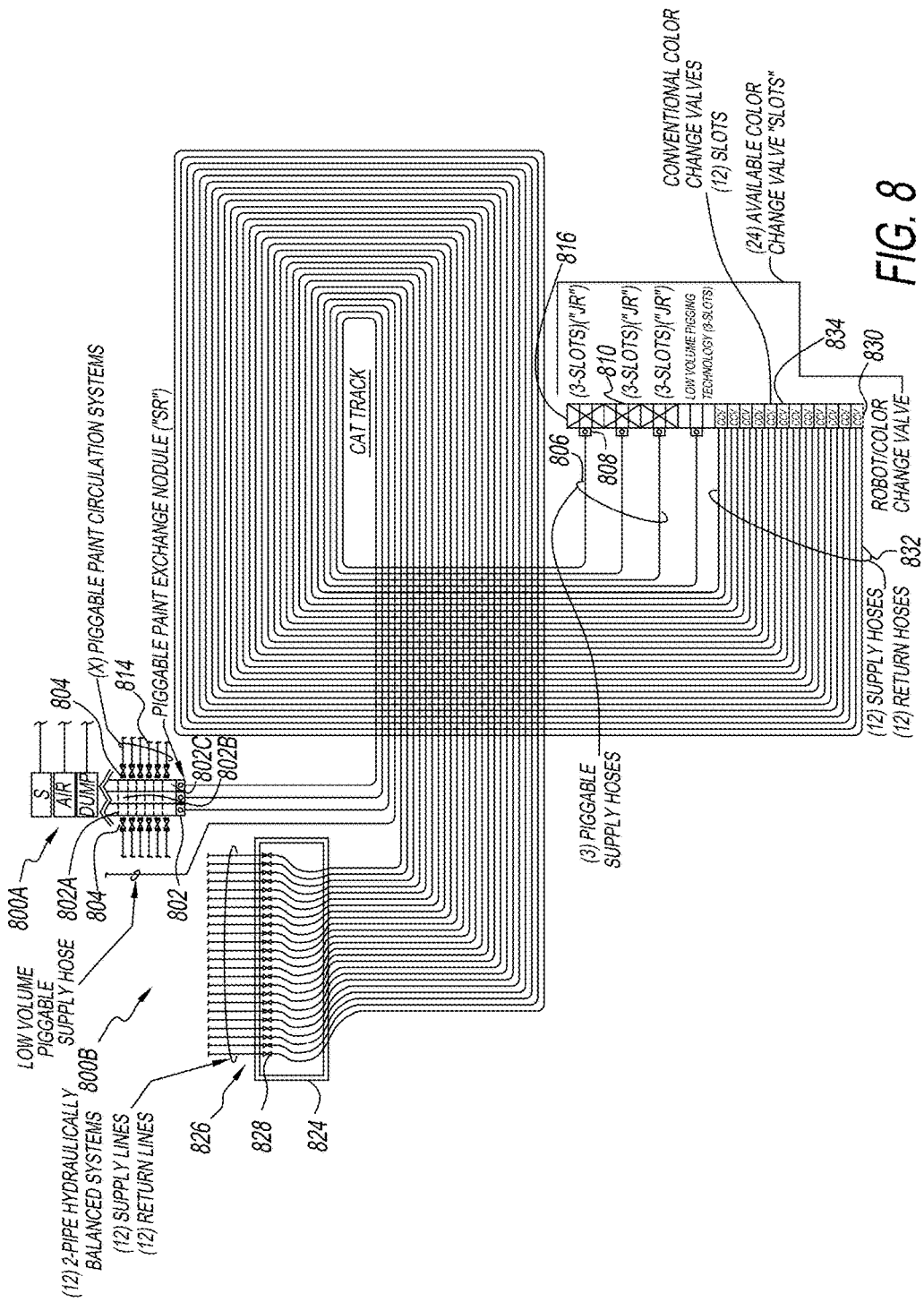
FIG. 8 depicts in detail an illustrative hybrid paint distribution system that includes a paint exchange module and a paint color change valve module of this disclosure.

FIG. 8 depicts an illustrative hybrid or integrated paint distribution system that includes a paint exchange assembly 802 and a paint color change valve module 810 (i.e. paint exchange modules 802A-C, full port valves 804, piggable paint supply hoses 806, pig launcher/receiver assembly 808, paint color change valve module 810, pipes 814, and paint application assembly 816) integrated with a conventional two pipe system which may be used for higher volume colors and a conventional low volume piggable special color system 800B (i.e., spray station paint box 824, spray station drop tubing 826, ball valves 828, robot color change assembly 830, robot paint supply and return hoses 832, and color change valves (CCV) 834.

In the paint exchange assembly 802 and a paint color change valve module system 810, robot/cartridge station drop details are shown for six (6) colors. It starts with the in line piggable paint exchange module 802 with twelve (12) pipes (one (1) supply line and one (1) return line for each color), and twelve (12) full port valves 804 for each line. None of the piping is graduated. Importantly, the paint exchange assembly 802 and a paint color change valve module system 810 of this disclosure 800A design has only three (3) (or less) piggable paint supply hoses 806 fluidly connecting to the paint color change valve module 810 which includes the pig launcher/receiver assembly 808.

The three (3) hose design is for a specific purpose. This design allows a continuous operation. The first hose supports the color being painted, and the second hose supports the next color to be painted. If there is a fault/failure, the third hose can replace either the first hose or the second hose. If any of these hoses require cleaning, then the third hose takes its place. The separately designed in line piggable paint exchange modules 802A-C allow this major reduction in the number of hoses (from six (6) to three (3)) in FIG. 8. Although FIG. 8 only shows six (6) colors for the 800A design, the same holds true for additional colors. So if the total number of colors is twenty four (24), with a total of forty eight (48) pipes 814, the present disclosure still uses only up to three (3) hoses 806. As mentioned before for efficiency purposes, the number of hoses 806 is three (3). However, in another embodiment, the number can be even two (2) or one (1).

This major reduction in the number of hoses allows similar reduction at the paint color change valve module 810 side. This makes the paint color change valve module 810 side (e.g., robot side) of the system much less complicated.

From operational perspective, paints are continuously circulated through the piping 814, through the in-line piggable paint exchange modules 802A-C, then back to the tanks (individual reservoir tanks and day tanks). The paint color change valve module 810 draws the needed colors from the in line piggable exchange module 802 through the three (3) piggable paint hoses 806 as follows: the first hose is for the first color; once used in the robot arm, the next color will be drawn from the second hose; there will be some time needed to change color; and the third hose is the backup hose which can be used while the others are cleaned. So basically only two (2) hoses 806 and a backup hose are used to draw from six (6) colors (as shown in FIG. 8), but as many as twenty four (24) or more colors are available at the in-line piggable paint exchange modules 802A-C. The in-line piggable paint exchange modules 802A-C may incorporate a single pig or a secondary back up pig in each line. The hoses also recirculate the unused paint back to the in-line piggable paint exchange modules 802A-C. Application of selected paints to a workpiece occurs at the paint application assembly 816 (e.g., a robot).

In the conventional system 800B, different color paints are stored in individual reservoirs and day tanks in a room (called mix room) away from the spray booths or stations. The main reason to keep the mix room away from the spray stations is that many paints are solvent based and flammable. Mix rooms are designed as explosion proof and rated Class 1/Division 1 areas with stringent restrictions based on safety and environmental needs. This need necessitates long piping network from the tanks to the spray stations. Each tank generally has a supply line and a return line. The two (2) pipe design (one supply line and one return line) is the most commonly used in the industry.

The conventional system 800B shown in FIG. 8 is for twelve (12) colors only. But as stated before, more than twenty (20) colors are typically used. The supply and return lines, totally twenty-four (24), one (1) supply and return the twelve (12) colors from and to the tanks. The tubing is graduated in size to maintain a minimum fluid velocity in the tubes. This tubing is generally stainless steel. There is a spray station paint box 824 where each color (e.g., twelve (12) conventional colors) is brought in using a spray station drop tubing 826, and returned via a return tube for each color. The spray station drop tubing 826 also includes ball valves 828 for paint isolation purposes. From the ball valves 828, two (2) hoses (one supply and one return) for each color then goes to the robot color change assembly 830. Thus, FIG. 8 shows a total of twenty-four (24) robot paint supply and return hoses 832, two (one supply and one return) for each color. FIG. 8 also shows twelve (12) color change valves (CCV) at 834. Every time for a color change, complete cleaning of the hoses and tubing is required. This is sometimes done by using "pigs" in the lines. Thus, the design may include pig launching/receiving assemblies also.

FIG. 8 also depicts a conventional two (2) pipe system 800B and a paint exchange module 800A used with a low volume piggable dead ended system which is not recirculated.

A paint exchange module consumes some paint not put on a substrate (e.g., vehicle) during color change. Therefore, a user may choose to utilize a conventional two (2) pipe system 800B for high turnover colors and a paint exchange module system of this disclosure 800A to add a multitude of additional colors painted in a production and a conventional piggable dead ended system for low volume colors. For example, black, silver, white may be used in a two (2) pipe system. All other colors (typically 10-20 colors) may be used a paint exchange module system of this disclosure 800A, for example, blue, metallic black, metallic white, green, orange, beige using the paint exchange module system alternative with only one, two or three hoses for all of these 10-20 colors.

FIG. 9 depicts various cross-sectional views of the paint exchange module of this disclosure. The paint exchange module is designed to be stacked with one (1) paint exchange module for each color recirculated. One (1) to one hundred (100) paint exchange modules can be stacked together to select the paint to be sent to the paint robot applicator or cartridge as shown by three (3) lines 602 in FIG. 6.

The paint solenoid or poppet valve is used to select the paint from the recirculation line and fill the center chamber of the stack and deliver paint using the circulation pressure to the piggable color changer valve in the robot. The center chamber 905A diameter is configured to meet the flow and viscosity requirements of the present disclosure of paint poppet or solenoid valve (FIG. 9(c)).

Figure 9A:
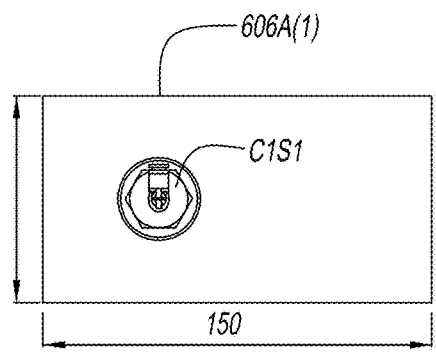
FIGS. 9 (*a*)-(*f*) depicts various cross-sectional views of paint exchange unit 606A(1) from FIG. 6, wherein FIG. 9(*e*) is a cross-section view of FIG. 9(*d*) along line A-A showing a portion of paint exchange unit 606A(1) having a paint circulation control valve C1S1 (i.e., a poppet valve or pneumatic solenoid valve)
Figure 9B:
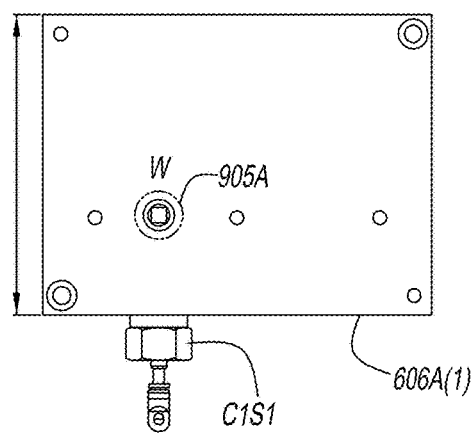
Figure 9C:
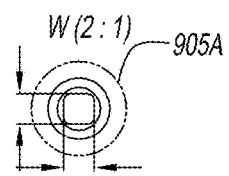
Figure 9D:
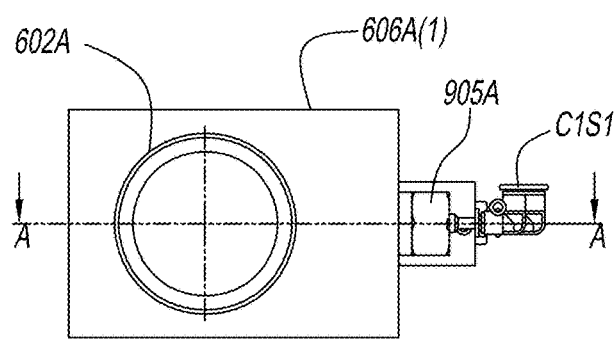
Figure 9E:
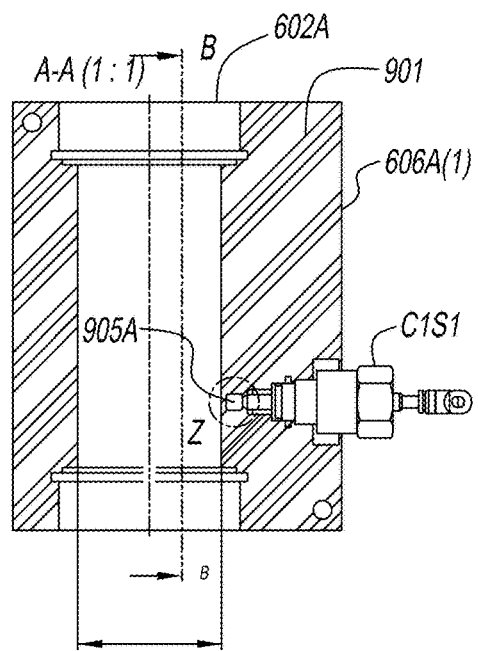
Figure 9F:
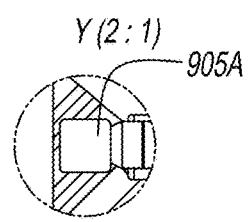
Figure 9G:
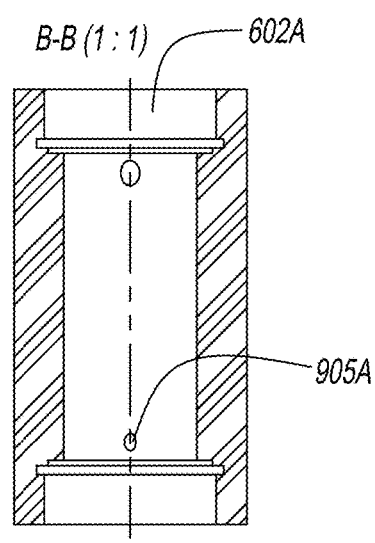

The paint poppet or solenoid valve (FIG. 9(e)) seats directly into and against the pressure of the circulation line. This is preferred and will be used when possible to provide no area in the circulation system to retain dirt or contaminates in the main circulation line. The area of this center chamber will be cleaned between color changes and therefore is directly related to the volume of paint that is consumed between color changes.

The paint poppet valve uses a fluid conduit from the main circulation line to a paint poppet valve seat. This method is used when possible to provide a larger area for higher flows. The valve and fluid the area of this center chamber can be cleaned between color changes and therefore is directly related to the amount of paint that is consumed between color changes.

The opening in 602A in FIG. 9(e) has the same diameter as 602A in FIG. 6 and will be full ported as not to restrict the flow of the circulation line, nor to allow for dirt or contamination to collect in the assembly, and to allow paint circulation line 602A, shown in FIG. 6, to be cleaned by flushing with or without the use of a pig.

The paint exchange module shown in FIG. 9 will be constructed of stainless steel or high pressure plastic. The paint exchange module will be isolated with full ported ball valves as depicted on 604 of FIG. 6.

The paint exchange module shown in FIG. 9 will incorporate spacers when needed to center the paint circulation line 602A in FIG. 6 and to allow for the operation of isolation valves 604 of FIG. 6.

The paint exchange module shown in FIG. 9 will be part of an assembly as shown in FIG. 6 with dump valve 618 to exhaust paint between color changes. Compressed air valve 712 will be added to push the unused paint back into circulation line 602A in FIG. 6 and purge valve 614 in FIG. 6 is used to inject solvent to clean center chamber 905A.

Referring to FIG. 9, several cross-sectional views of the paint exchange module of this disclosure are shown. FIG. 9 shows a single section of the 704 module (see FIG. 7) in detail. Three (3) paint exchange modules are shown in FIG. 7.

A paint exchange module 606A comprises a metal or plastic body 901 as shown in FIG. 9(e) which is connected directly to paint circulation system line 602A also shown in FIG. 6, wherein the paint passes directly through the body of the paint exchange assembly 600 without restriction. Paint exchange assembly 600 comprises a plurality of paint exchange modules 606A-C wherein a multitude of modules can be positioned side by side via with spacers, not shown, to allow from about 1 to about 100 paint exchange units 606A(1)-(3) connected to each other to allow one of the paint circulation system lines 602A-C to be selected individually and allow paint to flow through any of chamber(s) 905A-C to pig(s) 610A, B or C, show in FIG. 6, of the paint exchange module 606A to paint color change valve module 510 of FIG. 5, where paint is supplied to the paint application assembly 516 (e.g., a robot). The example in FIG. 6 shows three (3) parallel paint exchange modules 606A-C positioned side by side of the other and separated by a spacer, not shown. Each paint exchange module 606A, B or C includes three (3) paint exchange units (1), (2) and (3), stacked one on top of the other providing a fluid chamber 905A, B or C to allow paint to flow from any of paint circulation lines 602A-C to paint supply lines 620A-C, respectively.

Paint exchange module 606A comprises a fluid chamber 905A or conduit connecting each paint exchange unit 606A(1)-(3) to each other, thereby forming a continuous chamber 905A from dump valve 618 to pig 610A. Each of chambers 905A-C connect the associated paint exchange modules 606A-C to allow the selection of a paint color from any of paint circulation system lines 602A-C to enter chamber 905A-C, thereby allowing fluid communication to the paint color change valve module 510 of FIG. 5, where paint is supplied to the paint application assembly 516 (e.g., a robot).

Paint exchange module 606A further comprises a plurality of paint circulation control valves (e.g., solenoid or poppet valves) C1S3, C2S1 and C3S1 for each of the three (3) separate paint exchange units (606A(1)-(3)) in paint exchange module 606A. For example, paint circulation control valve (e.g., solenoid or poppet valve) C1S1, shown in FIG. 9(e), enables a particular paint color to enter chamber 905A from paint circulation line 602A. The diameter of chamber 905A can be designed for various flow requirements and is shown as an example using an 8 mm chamber diameter (Z) in FIG. 9(e). Optionally, a larger chamber diameter may be used or both can be incorporated into a single paint exchange unit.

Paint exchange module 606A also comprises a pig 610A which is disposed within in chamber 905A. Pig 610A, shown in FIG. 6, is used to supply the color paint to paint color change valve module 510 of FIG. 5, where paint is supplied to the paint application assembly 516 (e.g., a robot). Sensor block 612 is used to determine when pig 610A is away from paint exchange module 606A or when it returns from paint color change valve module 510 of FIG. 5 via piggable paint supply hose 620A.

After the paint has been delivered to paint color change valve module 510 of FIG. 5 and pig 610A returns to paint exchange module 606A, paint circulation control valve (e.g., solenoid or poppet valve) C1S1 and compressed air valve 616 are opened to return excess paint from chamber 905A, piggable paint supply hose 606A and pig 610A to paint circulation system line 602A by means of the compressed air. To remove any residual paint color from chamber 905A that has not be returned to paint circulation system line 602A, paint circulation control valve (e.g., solenoid or poppet valve) C1S1 is closed and solvent purge valve 614 and dump valve 618 are opened such that clamber 905A is flushed with solvent and removed from paint exchange module 606A via dump valve 618. A mixture of air and solvent to create a solvent vapor may also be incorporated in the design.

Spacers, not shown, can be disposed between paint exchange modules 606A-C to allow for isolation valves, not show, to accommodate various pipe diameters and for the operation of the valves.

When the robot requests a particular paint color, such as red, green, black, blue, white, etc., the computer actuated controller, will open the respective paint circulation control valve (e.g., solenoid or poppet valve), for example, valve C1S1, to draw the desired paint color from paint circulation line 602A, thereby allowing the desired paint color to enter chamber 905A into pig 610A. Thereafter, pig 610A pushes the desired paint color by fluid pressure from paint circulation line 602A into piggable paint supply hose 620A toward paint color change valve module 510 of FIG. 5, where paint is supplied to the paint application assembly 516 (e.g., a robot), for application to the vehicle or other product to be painted. Alternatively, compressed air valve 616 is opened to push the paint and pig 610A to the paint color change valve module 510.

Figure 10:
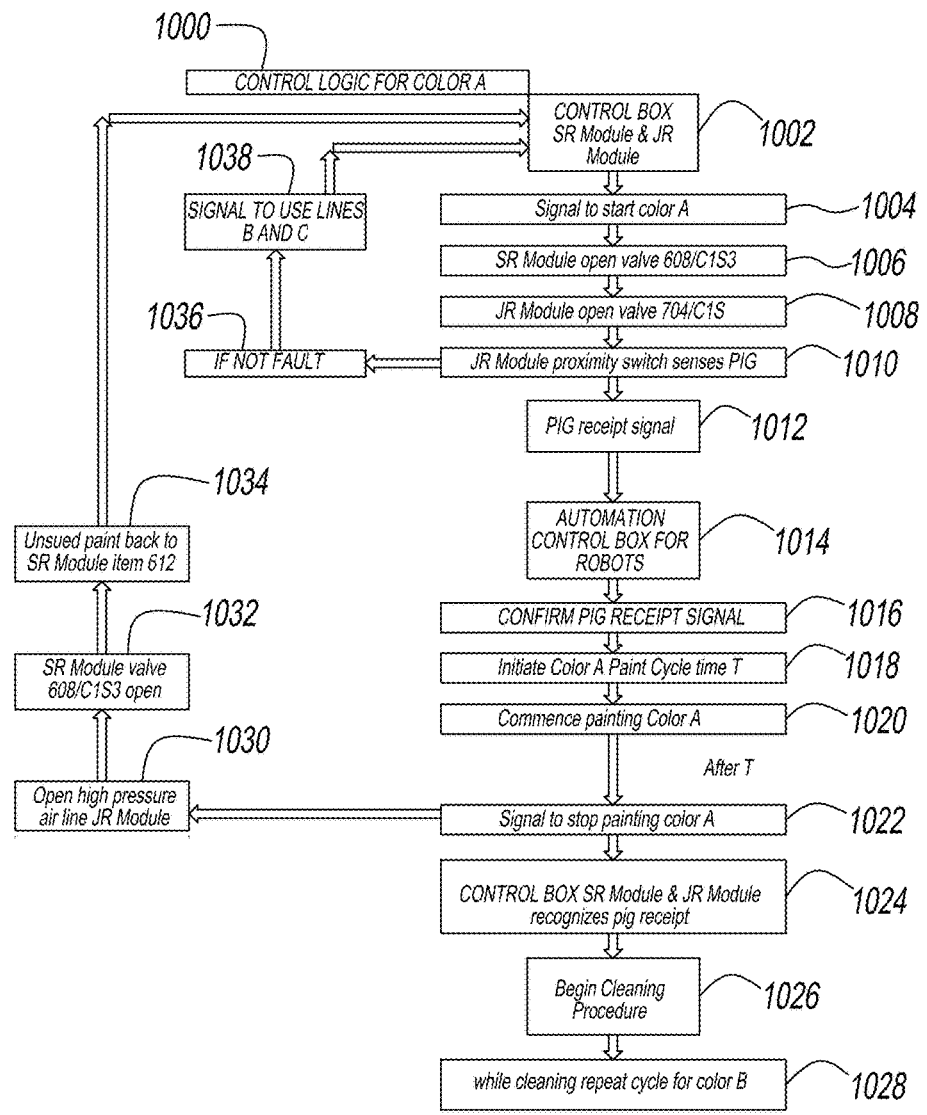
FIG. 10 depicts an illustrative logic control diagram for a painting cycle of a paint distribution system (i.e., painting with color A) that includes a paint exchange module and a paint color change valve module of this disclosure.

FIG. 10 depicts an illustrative logic control diagram for a painting cycle of a paint distribution system (i.e. painting with color A) that includes a paint exchange module and a paint color change valve module of this disclosure. As used in FIG. 10, "SR" refers to the paint exchange module and "JR" refers to the paint color change valve module.

Referring to FIG. 10, an illustrative control logic system 1000 is provided that corresponds to the function of the paint exchange module and the paint color change valve module as shown in FIGS. 4-7. The illustrative logic system provides three (3) separate paint colors from the paint exchange module to the paint color change valve module. Paint colors A, B or C can be used in any order, for example, using any one of the three (3) paint colors at one time, and the other two (2) paint colors ready to use or being cleaned in preparation for the next paint color.

The control box 1002 manages the paint exchange module and the paint color change valve module functions. The control box 1002 is also interfaced with the control box for robot automation 1014 which manages the robot operations.

The painting operation begins with a software program for paint color A. The control box 1002 receives a request for a specific paint color A signal from the automation/plant controls. The control box 1002 sends a signal to start paint color A operation 1004 to the paint exchange module and the paint color change valve module. This signal is received with sufficient time to load paint color A from the paint exchange module (Item 502 on FIG. 5) to the paint color change valve module (Item 510 on FIG. 5) filling the piggable paint hose (Item 506 on FIG. 5).

The control system operates the paint exchange module solenoid or poppet valve (e.g., C1S3 on FIG. 6) 1006, and the paint color change valve module solenoid valve (Item 704, CIS, on FIG. 7) 1008. The paint color change valve module proximity switch senses the pig is received (Item 706 on FIG. 7) 1010. If 1010 does not sense the signal then a "fault" signal is sent to control box 1002 via 1036. The control box 1002 then initiates signal to use hoses B or C instead 1038 and sends that signal to 1006 and 1008. The paint color change valve module sends the pig receipt signal 1012 to the automation control box for robots 1014. The automation control system confirms the signal 1016, and the paint color change valve module supplies paint color A to the automation.

The automation control box for robots 1014 then starts paint color A paint cycle (software loaded) 1018. Robots commence painting 1020 and stop after time T 1022 as signaled by automation control box 1014. A stoppage signal is then sent by the automation control box 1014 to the control box 1002. The control box 1002 signals to bring the unused paint back to the paint exchange module, and signals to open high pressure air line 1030 at the paint color change valve module 1024, to open paint exchange module valve 608 (see FIG. 6/C1S3) 1032. The high pressure drives the pig and hence the unused paint 1034 back to the paint exchange module. The control box 1002 confirms the receipt of the pig in the paint exchange module 1024. The control box 1002 receives the signal and signals to initiate cleaning cycle for hose 506 (see FIG. 5) 1026. The control box 1002 sends cleaning signal to the paint exchange module. While cleaning, a repeat cycle 1028 can be started for color B.

Figure 11:
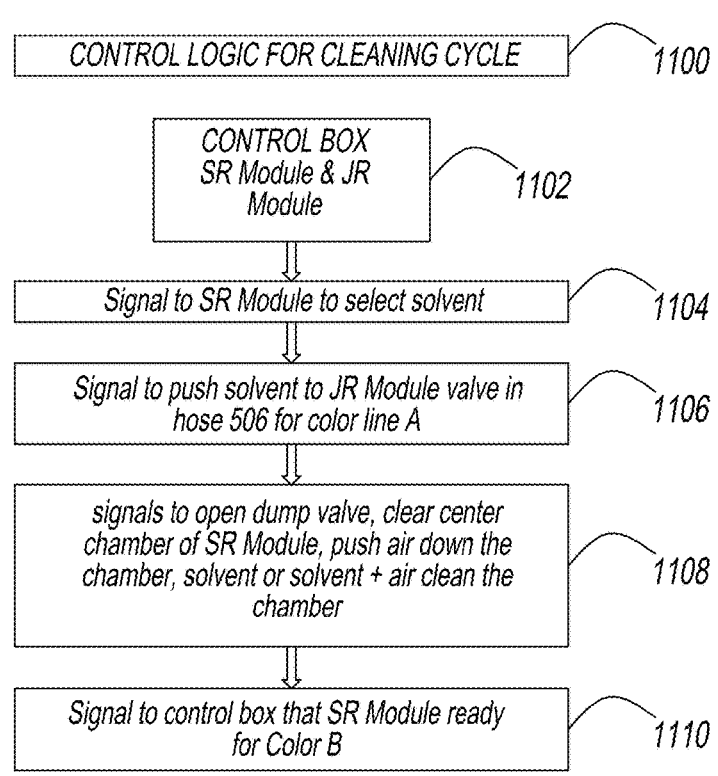
FIG. 11 depicts an illustrative logic control diagram for a cleaning cycle of a paint distribution system (i.e., painting with color A and color B) that includes a paint exchange module and a paint color change valve module of this disclosure.

FIG. 11 depicts an illustrative logic control diagram for a cleaning cycle of a paint distribution system (i.e., painting with color A and color B) that includes a paint exchange module and a paint color change valve module of this disclosure. As used in FIG. 11, "SR" refers to the paint exchange module and "JR" refers to the paint color change valve module.

Referring to FIG. 11, an illustrative control logic system 1100 is provided for a cleaning cycle of a paint distribution system. The control box 1102 sends a signal to the paint exchange module to select purge material which it does 1104. Next signal to the paint exchange module is to push purge material to the paint color change valve module valve through hose 506 (see FIG. 5) 1106. Line 506 (see FIG. 5) hose is cleaned 1108 an 1110. A dump valve opens on paint color change valve module valve and pig is sent back with a charge of purge material in the pig line 1108. Purge material or purge material with air, as described in U.S. Pat. No. 5,072,881, is pushed down the center chamber of 506 (see FIG. 5). The pig is cycled to clean the 506 tube (see FIG. 5). Line 506 (see FIG. 5) is now ready to accept another color 1110.

The paint distribution design of this disclosure is flexible enough to handle a range of supply pressures. This gives a lot of flexibility for the paint distribution system designers. The paint distribution design of the present disclosure covers pump supply pressures from 0 to about 300 psi. More preferably, the design covers supply pressures from 0 to about 200 psi. The design of the present disclosure covers flow rates from 0 to 30 gpm. More preferably, the design covers flow rates from 0 to about 9 gpm.

The paint distribution design of this disclosure may also include an in line temperature control apparatus. It may be in a form of a standard tube and tube or plate heat exchange.

The paint distribution design of this disclosure may also include in line flow control/measurement system.

In addition, the paint distribution design of this disclosure may also contain appropriate filters for paint filtration.

Further, the paint distribution design of this disclosure can include sensors. The sensors can measure the property characteristics of the paint as it flows through the paint distribution system and communicate this information to a controller.

The paint distribution design of this disclosure presents a paint distribution system that is balanced for optimum circulation velocity. The target range is 0.1 to 2.0 feet per second with a preferred velocity requirement of 0.5 to 1.0 fps. This velocity must be maintained while achieving the pressure requirement of the system.

Circulating pumps useful in this disclosure are configured to provide the mechanism by which to force paint from the one or more reservoir tanks and day tanks, through the one or more paint exchange modules and the one or more paint color change valve modules, to the one or more paint application station assemblies, and finally back to either the one or more reservoir tanks and day tanks or another holding facility. The pumps can be coupled with a respective motor (e.g., a variable frequency drive motor) with an associated motor control allowing the pump to change or alter the amount of pressure it exerts on the paint distribution system.

In an exemplary embodiment, the paint is supplied from the one or more reservoir tanks and day tanks through piping at a pressure ranging from about 100 psi to about 300 psi or greater. When the paint is passed to one or more paint application station assemblies and released, a pressure drop in the system occurs. When this happens, one or more circulating pumps can be signaled to increase the pressure in the paint distribution system to maintain the flow of paint within the upper and lower limits of a predetermined range.

The circulating pumps may include a direct current motor drive system. Such a motor control includes a microprocessor whereby the motor control may be adjusted to maintain the paint in the paint distribution system to have a set of parameters which remain within the predetermined range. The motor speed and current during pumping can be monitored using suitable sensors which provide an indication of the pressure and/or flow rate within the paint distribution system. In another exemplary embodiment, the paint distribution system can include more than one pump to pressurize the circulation system (e.g., multiple pumps in the paint distribution system).

In order to dispense the paint to designated parts, one or more paint application station assemblies are used to apply the paint to such parts. The one or more paint application station assemblies extend from the one or more paint color change valve modules. These one or more paint application station assemblies may include spray guns, bells, or application devices attached to the robots which expel the paint from the system. Thus, spray application devices can be either automated or manual in nature. In many applications today both robots and individuals apply paint to the respective parts for automobiles. For example, in the automotive industry body parts for various vehicles are generally painted both automatically with robots and manually with spray guns, in order to ensure substantially complete coverage of the part.

The properties of the paint as it flows through the paint distribution system of this disclosure include a set of parameters which defines conditions in the operating system. The set of parameters can include one or more of viscosity, flow rate, temperature or pressure values for the paint in the operating system. These parameters influence the property characteristics of the paint as it flows through the operating paint distribution system.

One or more controllers oversee the paint distribution system and typically have at least one input, configured to receive the input data signals, and at least one output, configured to transmit output data signals. The output data signals include instructions to maintain the set of parameters associated with the paint while it is in the operating system so that the set of parameters stay within a predetermined range.

In one exemplary embodiment, the output data signals include one or more of viscosity, flow rate, temperature or pressure values for the paint. In one exemplary embodiment, the output data signal is speed, where the speed can be considered either high or low, for example, this instructs a circulating pump to maintain a given pressure within the operating system. The predetermined range includes an upper and a lower limit for the values defined in the set of parameters. This predetermined range can be set by the user or operator of the paint distribution system in order to maintain the characteristics and/or quality of the paint within a desired specification. For example, if any changes in the pressure or flow rate occurred in the paint distribution system, such alterations could be regulated and controlled, thus, returning the paint to within its desired specification having a set of parameters within its predetermined ranges.

In another example, an input data signal having the set of parameters is transmitted to the controller. When the input data signal is received, the controller generates output data signals. The output data signals are transmitted to, for example, a circulating pump in the operating paint distribution system. The circulating pump is instructed with the output data signal to maintain the set of parameters within a predetermined range.

In another exemplary embodiment, the one or more controllers include a plurality of inputs and outputs, allowing for additional input or output data signals to be sent or generated. In one particular embodiment, the controller is a process logic control (PLC). In another exemplary embodiment, the one or more controllers may also include one or more computers having associated software, wherein the one or more computers provide the user or operator the ability to make changes to the designated programming, thus introducing more flexibility into the system. Moreover, the one or more computers can be accessed remotely through a network which allows monitoring and control of the circulation system from various locations.

In still another exemplary embodiment, referring to FIGS. 5, 6 and 7 in the context of a three (3) color system (i.e., AB/C), the paint distribution system of this disclosure provides the three (3) colors from the paint exchange module to the paint color change valve module. Paints A, B or C can be used in any order, using any one (1) of the three (3) at one time, and the other two (2) ready to use or being cleaned in preparation for the next color.

The paint distribution system controller receives a request for a specific paint color "A" signal from a controller at the paint application station assembly. This signal is received with sufficient time to load paint color "A" from the paint exchange module (502 in FIG. 5) to the paint color change valve module (510 in FIG. 5) filling the piggable paint hose (506 in FIG. 5). The paint distribution system controller operates the paint exchange module solenoid or poppet valve (608 (C1S3) in FIG. 6). and paint color change valve module solenoid or poppet valve (704 (C1S) in FIG. 7). The paint color change valve module proximity switch senses the pig is received (706 in FIG. 7).

The paint distribution system controller has the ability to send a single or multiple colors from the paint exchange module to the paint color change valve module. When a second or more lines are used, the controller receives a request for a second paint color "B" signal from a controller at the paint application station assembly. This signal is received with sufficient time to load paint color "B" from the paint exchange module (502 in FIG. 5) to the paint color change valve module (510 in FIG. 5) filling the piggable paint hose (506 in FIG. 5). The paint color change valve module proximity switch senses the pig is received (706 in FIG. 7). The paint distribution system controller operates the paint exchange module solenoid or poppet valve (608 (C2S3) in FIG. 6) and the paint color change valve module solenoid valve (704 (C2S) in FIG. 7). The paint color change valve module proximity switch senses the pig is received. (706 in FIG. 7).

The paint color change valve module sends a ready to paint with paint color "A" signal from the paint distribution system controller to the controller at the paint application station assembly. The controller at the paint application station assembly confirms, and the paint color change valve module supplies paint color "A" to the paint application station assembly.

When the paint application station assembly is finished painting color "A", the paint color change valve module receives a "color change" signal from the paint application station assembly controller. The paint distribution system controller pushes the un-used paint back into the circulation system, and senses that the pig has returned to the paint exchange module (612 in FIG. 6). The paint distribution system controller will control the paint color change valve module solvent, air and dump solenoid valves (710, 712 and 714 in FIG. 7) to complete the color change to the paint application station assembly. The system is empty at the end of the cleaning cycle.

The paint color change valve module sends a ready to paint with paint color "B" signal from the paint distribution system controller to the paint application station assembly controller. The paint application station assembly controller confirms and the color change valves of the paint color change valve module supplies paint color "B" to the paint application station assembly.

The paint distribution system controller receives a command for the next paint color "C" signal from the paint application station assembly controller. The "C" paint is supplied from the paint exchange module (502 in FIG. 5) to the paint color change valve module (510 in FIG. 5) filling the piggable paint hose (506 in FIG. 5). The paint distribution system controller operates the paint exchange module solenoid or poppet valve (608 (C3S3) in FIG. 6) and the paint color change valve module solenoid valve (704 (C3S) in FIG. 7). The paint color change valve module proximity switch senses the pig is received (706 in FIG. 7).

The paint distribution system controller signals the paint color change valve module and paint exchange module to clean paint color "B". When the paint application station assembly is finished painting color "B", the paint color change valve module receives a "color change" signal from the paint application station assembly controller. The paint distribution system controller pushes the un-used paint back into the circulation system, and senses that the pig has returned to the paint exchange module (612 in FIG. 6). The paint distribution system controller controls the paint color change valve module solvent, air, or purge material with air (as described in U.S. Pat. No. 5,072,881) solenoid valve, and dump solenoid valves (710, 712 and 714 in FIG. 7) to complete the color change to the paint application station assembly. The system is empty at the end of the cleaning cycle.

The paint distribution system controller receives a command for the next paint color "D" paint from the paint application station assembly controller. This paint is loaded now into the cleaned and evacuated lines previously used on paint color "A". An individual paint is supplied from the paint exchange module (502 in FIG. 5) to the paint color change valve module (510 in FIG. 5) filling the piggable paint hose (506 in FIG. 5). The paint distribution system controller operates the paint exchange module solenoid valve (608 (C1S3) in FIG. 6) and the paint color change valve module solenoid valves (704 (C1S) in FIG. 7). The paint color change valve module proximity switch senses the pig is received (706 in FIG. 7). Paint color "D" is now supply paint to the paint application station assembly.

This sequence of any number of paint colors A-Z at the paint exchange module can now supply any number of paint color change valve module valves. The multiple paint color change valve module valves are used to increase speed and provide a spare system for reliability.

An illustrative controller useful in the paint distribution system of this disclosure is described, for example, in U.S. Pat. No. 6,090,450, the disclosure of which is incorporated herein by reference in its entirety.

In another exemplary embodiment, the paint distribution system of this disclosure further comprises one or more paint booths. The one or more paint booths generally include a housing in which parts can pass or are maintained while the paint is applied to the particular parts or components as they pass through a housing. Spray application devices are usually connected by supply ducts, such as hoses, to the paint supply in the paint booths. In an exemplary embodiment, paint is applied to parts of a vehicle while they travel along an assembly line where a plurality of robots can be positioned along opposite sides of the assembly line as it passes through the paint booth. In addition, manual spray guns may be used to paint some portions of the vehicle, particularly those which pose difficult-to-reach locations.

As described above, the paint distribution system may include more than one paint, such that one paint may exist in one hose from the paint exchange module, while another one may exist in a second hose from the paint exchange module. Thus, multiple paints can be utilized within a single paint booth. However, the system can also be arranged so that multiple booths can be used to provide locations for additional paints to be applied.

The method of this disclosure provides for a color change-over in the paint distribution system without detrimentally affecting the characteristics of paint circulating in the system. When one colored paint is spraying from one hose from the paint exchange module, another colored paint can be available for spraying in a second hose from the paint exchange module. When a new batch of parts enters the paint booth and a color changeover is required, the controller receives the necessary information, and switches over to the new color and required operating conditions. The pressures maintained in the hoses are sufficient to maintain flow speed, while avoiding particle settling, reducing pumping energy and lowering the shear force on the paint.

In an embodiment, an illustrative cleaning method for the spray painting or coating equipment used in the paint distribution system of this disclosure is described, for example, in U.S. Pat. No. 5,072,881, the disclosure of which is incorporated herein by reference in its entirety.

The paint distribution system of this disclosure is constructed of material capable of containing the paint. For example, it can be comprised of metal or plastic components, such that the paint does not substantially react physically or chemically with the material in any way to substantially affect the paint's composition or quality. Stainless steel is commonly used for various piping and fittings that make up the paint distribution system.

The paint distribution design of this disclosure offers a number of major benefits over the prior art designs including, for example, the design reduces the number of hoses from over forty eight (48) (for twenty four (24) colors) to three (3) or less; the reduction in number of hoses results in reduction in paint color change valves; the in line piggable paint exchange module design allows adding more colors without changing the robot side system; all hoses and spray station tubing can be piggable; the main circulation tubing from the tanks (from the reservoir tanks and day tanks) can also be piggable; completely eliminates the need for graduated tubing (e.g., this means the tubing (see 514 in FIG. 5) can be of bigger size than the prior art tubing (see 106 in FIG. 1); there is a significant reduction of number/length of tubing and number of valves; combining the benefits from bigger size tubing and reduction in number/length of tubing and number of valves, pressure drops are significantly reduced, paints (especially low usage colors) can be circulated at lower pressures and flow rates; this means that lower supply line pressures are needed (see Example 1 below), and also lower flow rates are needed; a piggable system means reduced settling risks, quick color change, and reduced energy costs; lower pressures and flow rates will result in reduced shear degradation; this also means that the design in the present disclosure will accommodate paints with variety of paint viscosities and shear rates; reduced tubing, hoses and valves will obviously translate into much reduced costs; and the design will allow easy balance of the system at minimum velocity and supply pressure.

The following clauses are preferred embodiments of this disclosure.

1. A paint distribution system comprising:
   at least one paint reservoir;
   at least one paint exchange assembly, wherein said paint exchange assembly comprises at least one paint exchange module, wherein each paint exchange module comprises a plurality of paint exchange units;
   a plurality of paint circulation lines disposed between said paint reservoir and each said paint exchange module, wherein each said paint circulation line supplies at least one colored paint to said paint exchange unit;
   at least one paint color change valve module; and
   at least one paint supply line in fluid communication between the paint exchange module and the paint color change valve module;
   wherein the paint exchange module is configured such that the number of said paint supply lines in fluid communication between the paint exchange module and the paint color change valve module is less than the number of paint circulation lines from the paint reservoir to the paint exchange module.

2. The paint distribution system of clause 1 wherein the number of said paint supply lines in fluid communication between the paint exchange module and the paint color change valve module is between about 1 to about 3.

3. The paint distribution system of clause 1 further comprising at least one paint application assembly in fluid communication with the paint color change valve module.

4. The paint distribution system of clause 1 further comprising at least one controller having an input that receives at least one input data signal, and an output that transmits at least one output data signal.

5. The paint distribution system of clause 4 wherein the controller is a process logic controller.

6. The paint distribution system of clause 4 wherein the input data signal and the output data signal are at least one parameter selected from the group consisting of: viscosity, flow rate, temperature and pressure values for the paint; and maintain the parameter within a predetermined range.

7. The paint distribution system of clause 1 wherein said paint supply line is piggable.

8. The paint distribution system of clause 1 wherein the number of paint circulation lines is about 2 to about 100.

9. The paint distribution system of clause 1 wherein the paint exchange module includes at least one pig launcher/receiver assembly.

10. The paint distribution system of clause 1 wherein the at least one pig launcher/receiver assembly has a single pig or dual pigs.

11. The paint distribution system of clause 3 wherein the paint application assembly comprises at least one robot spray assembly, at least one manual spray assembly, or a combination thereof.

12. The paint distribution system of clause 1 further comprising at least one purge valve, at least one compressed air valve, and at least one dump valve.

13. The paint distribution system of clause 12 which utilizes a purge material comprising a mixture of air and solvent, or a mist of solvent created by blending air and solvent.

14. The paint distribution system of clause 3 further comprising at least one in line circulating pump, at least one filter, at least one temperature control, at least one flow control, at least one sensor and/or measurement equipment.

15. The paint distribution system of clause 14 wherein the input data signal and the output data signal operate the circulating pump, filter, temperature control, flow control, sensor and/or measurement equipment.

16. The paint distribution system of clause 1 wherein the paint circulation line operates at a pressure between about 0 and about 500 psi.

17. The paint distribution system of clause 1 wherein the paint circulation line operates at a pressure between about 0 and about 200 psi.

18. The paint distribution system of clause 1 wherein flow rate in the paint supply line is between about 0 and about 30 gallons per minute (gpm).

19. The paint distribution system of clause 1 wherein flow rate in the paint supply line is between about 0 and about 9 gallons per minute (gpm).

20. The paint distribution system of clause 1 wherein the paint exchange assembly comprises:
   at least one paint exchange module, wherein each said paint exchange module comprises a plurality of paint exchange units, wherein each said paint exchange unit comprises a housing, a paint circulation control valve, and at least one fluid conduit disposed within said housing, and wherein the fluid conduits from aligned paint exchange units are in fluid communication with one another, thereby forming a single fluid chamber;
   at least one paint circulation line inlet in fluid communication with the fluid chamber via the paint circulation control valve;
   at least one pig launcher/receiver assembly having at least one or more pigs;
   at least one purge material valve assembly in fluid communication with said fluid chamber;
   at least one compressed air valve assembly in fluid communication with said fluid chamber;
   at least one dump valve assembly in fluid communication with said fluid chamber; and
   at least one piggable paint supply hose in fluid communication with said fluid chamber and said pig launcher/receiver assembly, wherein said one or more pigs are capable of passing from said pig launcher/receiver assembly to said paint supply hose.

21. The paint distribution system of clause 20 wherein, in the paint exchange assembly, the at least one piggable paint supply hose is in fluid communication with a piggable paint color change valve module.

22. The paint distribution system of clause 20 wherein the paint exchange assembly comprises at least three paint exchange modules.

23. The paint distribution system of clause 20 wherein, in the paint exchange assembly, the fluid chamber has a diameter of about 9 mm.

24. The paint distribution system of clause 20 wherein, in the paint exchange assembly, the paint circulation control valve comprises a solenoid valve or poppet valve.

25. The paint distribution system of clause 20 wherein the paint exchange assembly further comprises a sensor block.

26. The paint distribution system of clause 25 wherein, in the paint exchange assembly, the sensor block determines when the pig is away from the paint exchange module or when it returns from the paint color change valve module.

27. The paint distribution system of clause 20 wherein the paint exchange assembly further comprises at least one spacer disposed between the paint exchange modules.

28. The paint distribution system of clause 27 wherein, in the paint exchange assembly, the at least one spacer allows for isolation valves to accommodate various pipe diameters and for operation of the valves.

29. The paint distribution system of clause 20 wherein, in the paint exchange assembly, the paint exchange modules are stacked side by side to one another.

30. The paint distribution system of clause 20 wherein, in the paint exchange assembly, the fluid conduits from aligned paint exchange units of each said paint exchange module are aligned vertically.

31. A method for supplying a paint for coating of a workpiece, said method comprising:
  a) providing a paint distribution system comprising:
    at least one paint reservoir;
    at least one paint exchange assembly, wherein said paint exchange assembly comprises at least one paint exchange module, wherein each paint exchange module comprises a plurality of paint exchange units;
    a plurality of paint circulation lines disposed between said paint reservoir and each said paint exchange module, wherein each said paint circulation line supplies at least one colored paint to said paint exchange unit;
    at least one paint color change valve module; and
    at least one paint supply line in fluid communication between the paint exchange module and the paint color change valve module;
    wherein the paint exchange module is configured such that the number of said paint supply lines in fluid communication between the paint exchange module and the paint color change valve module is less than the number of paint circulation lines from the paint reservoir to the paint exchange module;
  b) circulating one or more colored paints through the paint distribution system; and
  c) coating the workpiece with the one or more colored paints.

32. The method of clause 31 wherein the workpiece is an automotive part.

33. The method of clause 31 wherein, in the paint distribution system, the number of said paint supply lines in fluid communication between the paint exchange module and the paint color change valve module is between about 1 to about 3.

34. The method of clause 31 wherein the paint distribution system further comprises at least one paint application assembly in fluid communication with the paint color change valve module.

35. The method of clause 31 wherein the paint distribution system further comprises at least one controller having an input that receives at least one input data signal, and an output that transmits at least one output data signal.

36. The method of clause 35 wherein the controller is a process logic controller.

37. The method of clause 35 wherein the input data signal and the output data signal are at least one parameter selected from the group consisting of: viscosity, flow rate, temperature and pressure values for the paint; and maintain the parameter within a predetermined range.

38. The method of clause 31 wherein, in the paint distribution system, said paint supply line is piggable.

39. The method of clause 31 wherein, in the paint distribution system, the number of paint circulation lines is between about 2 to about 100.

40. The method of clause 31 wherein, in the paint distribution system, the paint exchange module includes at least one pig launcher/receiver assembly.

41. The method of clause 34 wherein the paint application assembly comprises at least one robot spray assembly, at least one manual spray assembly, or a combination thereof.

42. The method of clause 31 wherein the paint distribution system further comprises at least one purge valve, at least one compressed air valve, and at least one dump valve.

43. The method of clause 42 wherein the paint distribution system utilizes a purge material comprising a mixture of air and solvent, or a mist of solvent created by blending air and solvent.

44. The method of clause 35 wherein the paint distribution system further comprises at least one inline circulating pump, at least one filter, at least one temperature control, at least one flow control, at least one sensor and/or measurement equipment.

45. The method of clause 44 wherein, in the paint distribution system, the input data signal and the output data signal operate the circulating pump, filter, temperature control, flow control, sensor and/or measurement equipment.

46. The method of clause 31 wherein, in the paint distribution system, the paint circulation line operates at a pressure between about 0 to about 500 psi.

47. The method of clause 46 wherein, in the paint distribution system, the paint circulation line operates at a pressure between about 0 to about 200 psi.

48. The method of clause 31 wherein, in the paint distribution system, flow rate in the paint supply line is between about 0 to about 30 gallons per minute (gpm).

49. The method of clause 31 wherein, in the paint distribution system, flow rate in the paint supply line is between about 0 to about 9 gallons per minute (gpm).

50. The method of clause 31 wherein, in the paint distribution system,
  each said paint exchange unit comprises a housing, a paint circulation control valve, and at least one fluid conduit disposed within said housing, and wherein the fluid conduits from aligned paint exchange units are in fluid communication with one another, thereby forming a single fluid chamber; and wherein said paint exchange assembly further comprises:
    at least one paint circulation line inlet in fluid communication with the fluid chamber via the paint circulation control valve;
    at least one pig launcher/receiver assembly having at least one or more pigs;
    at least one purge material valve assembly in fluid communication with said fluid chamber;
    at least one compressed air valve assembly in fluid communication with said fluid chamber;
    at least one dump valve assembly in fluid communication with said fluid chamber; and
    at least one piggable paint supply hose in fluid communication with said fluid chamber and said pig launcher/receiver assembly, wherein said one or more pigs are capable of passing from said pig launcher/receiver assembly to said paint supply hose.

51. The method of clause 50 wherein, in the paint exchange assembly, the at least one piggable paint supply hose is in fluid communication with a piggable paint color change valve module.

52. The method of clause 50 wherein the paint exchange assembly comprises at least three paint exchange modules.

53. The method of clause 50 wherein, in the paint exchange assembly, the fluid chamber has a diameter of about 9 mm.

54. The method of clause 50 wherein, in the paint exchange assembly, the paint circulation control valve comprises a solenoid valve or a poppet valve.

55. The method of clause 50 wherein the paint exchange assembly further comprises a sensor block.

56. The method of clause 55 wherein, in the paint exchange assembly, the sensor block determines when the pig is away from the paint exchange module or when it returns from the paint color change valve module.

57. The method of clause 50 wherein the paint exchange assembly further comprises at least one spacer disposed between the paint exchange modules.

58. The method of clause 57 wherein, in the paint exchange assembly, the at least one spacer allows for isolation valves to accommodate various pipe diameters and for operation of the valves.

59. The method of clause 50 wherein, in the paint exchange assembly, the paint exchange modules are positioned side by side to one another.

60. The method of clause 50 wherein, in the paint exchange assembly, the fluid conduits from aligned paint exchange units are aligned vertically.

61. An integrated paint distribution system comprising a first paint distribution system integrated with a second paint distribution system, wherein said first paint distribution system comprises:
at least one paint reservoir;
at least one paint exchange assembly, wherein said paint exchange assembly comprises at least one paint exchange module, wherein said paint exchange module comprises a plurality of paint exchange units;
a plurality of paint circulation lines disposed between said paint reservoir and each said paint exchange module, wherein each said paint circulation line supplies at least one colored paint to said paint exchange unit;
at least one paint color change valve module; and
at least one paint supply line in fluid communication between the paint exchange module and the paint color change valve module;
wherein the paint exchange module is configured such that the number of said paint supply lines in fluid communication between the paint exchange module and the paint color change valve module is less than the number of paint circulation lines from the paint reservoir to the paint exchange module; and
wherein said second paint distribution system comprises:
at least one paint reservoir;
at least one spray station paint assembly;
a plurality of paint circulation lines disposed between said paint reservoir and said spray station paint assembly;
at least one paint color change assembly; and
a plurality paint supply lines in fluid communication between the spray station paint assembly and the paint color change assembly;
wherein the at least one spray station paint assembly is configured such that the number of paint supply lines in fluid communication between the spray station paint assembly and the paint color change assembly is equal to the number of paint circulation lines from the paint reservoir to the spray station paint assembly.

62. The integrated paint distribution system of clause 61 wherein, in the first paint distribution system, the paint exchange unit comprises a housing, a paint circulation control valve, and a fluid conduit disposed within said housing, and wherein the fluid conduits from aligned paint exchange units are in fluid communication with one another, thereby forming a single fluid chamber; and wherein said paint exchange assembly further comprises:
at least one paint circulation line inlet in fluid communication with the fluid chamber via the paint circulation control valve;
at least one pig launcher/receiver assembly having at least one or more pigs;
at least one purge material valve assembly in fluid communication with said fluid chamber;
at least one compressed air valve assembly in fluid communication with said fluid chamber;
at least one dump valve assembly in fluid communication with said fluid chamber; and
at least one piggable paint supply hose in fluid communication with said fluid chamber and said pig launcher/receiver assembly, wherein said one or more pigs are capable of passing from said pig launcher/receiver assembly to said paint supply hose.

63. A paint exchange assembly comprising:
at least one paint exchange modules, wherein each said paint exchange module comprises a plurality of paint exchange units, wherein each said paint exchange unit comprises a housing, a paint circulation control valve, and at least one fluid conduit disposed within said housing, and wherein the fluid conduits from aligned paint exchange units are in fluid communication with one another, thereby forming a single fluid chamber;
at least one paint circulation line inlet in fluid communication with the fluid chamber via the paint circulation control valve;
at least one pig launcher/receiver assembly having at least one or more pigs;
at least one purge material valve assembly in fluid communication with said fluid chamber;
at least one compressed air valve assembly in fluid communication with said fluid chamber;
at least one dump valve assembly in fluid communication with said fluid chamber; and
at least one piggable paint supply hose in fluid communication with said fluid chamber and said pig launcher/receiver assembly, wherein said one or more pigs are capable of passing from said pig launcher/receiver assembly to said paint supply hose.

64. The paint exchange assembly of clause 63 wherein the at least one piggable paint supply hose is in fluid communication with a piggable paint color change valve module.

65. The paint exchange assembly of clause 63 which comprises at least three paint exchange modules.

66. The paint exchange assembly of clause 63 wherein the fluid chamber has a diameter of about 9 mm.

67. The paint exchange assembly of clause 63 wherein the paint circulation control valve comprises a solenoid valve or poppet valve.

68. The paint exchange assembly of clause 63 further comprising a sensor block.

69. The paint exchange assembly of clause 68 wherein the sensor block determines when the pig is away from the paint exchange module or when it returns from the paint color change valve module.

70. The paint exchange assembly of clause 63 further comprising at least one spacer disposed between the paint exchange modules.

71. The paint exchange assembly of clause 70 wherein the at least one spacer allows for isolation valves to accommodate various pipe diameters and for operation of the valves.

72. The paint exchange assembly of clause 63 wherein the paint exchange modules are positioned side by side to one another.

73. The paint exchange assembly of clause 63 wherein the fluid conduits from aligned paint exchange units are aligned vertically.

74. A liquid distribution system comprising:
   at least one liquid reservoir;
   at least one liquid exchange assembly, wherein said liquid exchange assembly comprises at least one liquid exchange module;
   a plurality of liquid circulation lines disposed between said liquid reservoir and at least one liquid exchange module, wherein each said liquid circulation line supplies at least one liquid to said liquid exchange module;
   at least one liquid change valve module; and
   at least one liquid supply line in fluid communication between the liquid exchange module and the liquid change valve module;
   wherein the liquid exchange module is configured such that the number of said liquid supply lines in fluid communication between the liquid exchange module and the liquid change valve module is less than the number of liquid circulation lines from the liquid reservoir to the liquid exchange module.

75. The liquid distribution system of clause 74 wherein the at least one liquid comprises at least one paint.

76. The liquid distribution system of clause 74 wherein
   each said liquid exchange module comprises a plurality of liquid exchange units, wherein each said liquid exchange unit comprises a housing, a liquid circulation control valve, and at least one fluid conduit disposed within said housing, and wherein the fluid conduits from aligned liquid exchange units are in fluid communication with one another, thereby forming a single fluid chamber; and wherein said liquid exchange assembly further comprises:
   at least one liquid circulation line inlet in fluid communication with the fluid chamber via the liquid circulation control valve;
   at least one pig launcher/receiver assembly having at least one or more pigs;
   at least one purge material valve assembly in fluid communication with said fluid chamber;
   at least one compressed air valve assembly in fluid communication with said fluid chamber;
   at least one dump valve assembly in fluid communication with said fluid chamber; and
   at least one piggable liquid supply hose in fluid communication with said fluid chamber and said pig launcher/receiver assembly, wherein said one or more pigs are capable of passing from said pig launcher/receiver assembly to said liquid supply hose.

77. A method for supplying a liquid, said method comprising:
   a) providing a liquid distribution system comprising:
   at least one liquid reservoir;
   at least one liquid exchange assembly, wherein said liquid exchange assembly comprises at least one liquid exchange module;
   a plurality of liquid circulation lines disposed between said liquid reservoir and at least one liquid exchange module, wherein each said liquid circulation line supplies at least one liquid to said liquid exchange module;
   at least one liquid change valve module; and
   at least one liquid supply line in fluid communication between the liquid exchange module and the liquid change valve module;
   wherein the liquid exchange module is configured such that the number of said liquid supply lines in fluid communication between the liquid exchange module and the liquid change valve module is less than the number of liquid circulation lines from the liquid reservoir to the liquid exchange module;
   b) circulating at least one liquid through the liquid distribution system; and
   c) utilizing the at least one liquid in at least one liquid utilization module.

78. The method of clause 77 wherein the at least one liquid comprises at least one paint.

79. The method of clause 77 wherein, in the liquid distribution system,
   each said liquid exchange module comprises a plurality of liquid exchange units, wherein said liquid exchange unit comprises a housing, at least one liquid circulation control valve, and at least one fluid conduit disposed within said housing, and wherein the fluid conduits from aligned liquid exchange units are in fluid communication with one another, thereby forming a single fluid chamber; and wherein said liquid exchange assembly further comprises:
   at least one liquid circulation line inlet in fluid communication with the fluid chamber via the liquid circulation control valve;
   at least one pig launcher/receiver assembly having at least one or more pigs;
   at least one purge material valve assembly in fluid communication with said fluid chamber;
   at least one compressed air valve assembly in fluid communication with said fluid chamber;
   at least one dump valve assembly in fluid communication with said fluid chamber; and
   at least one piggable liquid supply hose in fluid communication with said fluid chamber and said pig launcher/receiver assembly, wherein said one or more pigs are capable of passing from said pig launcher/receiver assembly to said liquid supply hose.

80. A liquid exchange assembly comprising:
   at least one liquid exchange module, wherein each said liquid exchange module comprises a plurality of liquid exchange units, wherein each said liquid exchange unit comprises a housing, a liquid circulation control valve, and at least one fluid conduit disposed within said housing, and wherein the fluid conduits from aligned liquid exchange units are in fluid communication with one another, thereby forming a single fluid chamber; and wherein said liquid exchange assembly further comprises:
   at least one liquid circulation line inlet in fluid communication with the fluid chamber via the liquid circulation control valve;
   at least one pig launcher/receiver assembly having at least one or more pigs;
   at least one purge material valve assembly in fluid communication with said fluid chamber, wherein the purge material is optionally a mixture of air and a solvent, or a mist of solvent created by blending air and solvent;
   at least one compressed air valve assembly in fluid communication with said fluid chamber;
   at least one dump valve assembly in fluid communication with said fluid chamber; and
   at least one piggable liquid supply hose in fluid communication with said fluid chamber and said pig launcher/receiver assembly, wherein said one or more pigs, and optionally one or more back up pigs, are capable of passing from said pig launcher/receiver assembly to said liquid supply hose.

81. The liquid exchange assembly of clause 80 wherein the at least one liquid comprises at least one paint.

EXAMPLES

Figure 3:
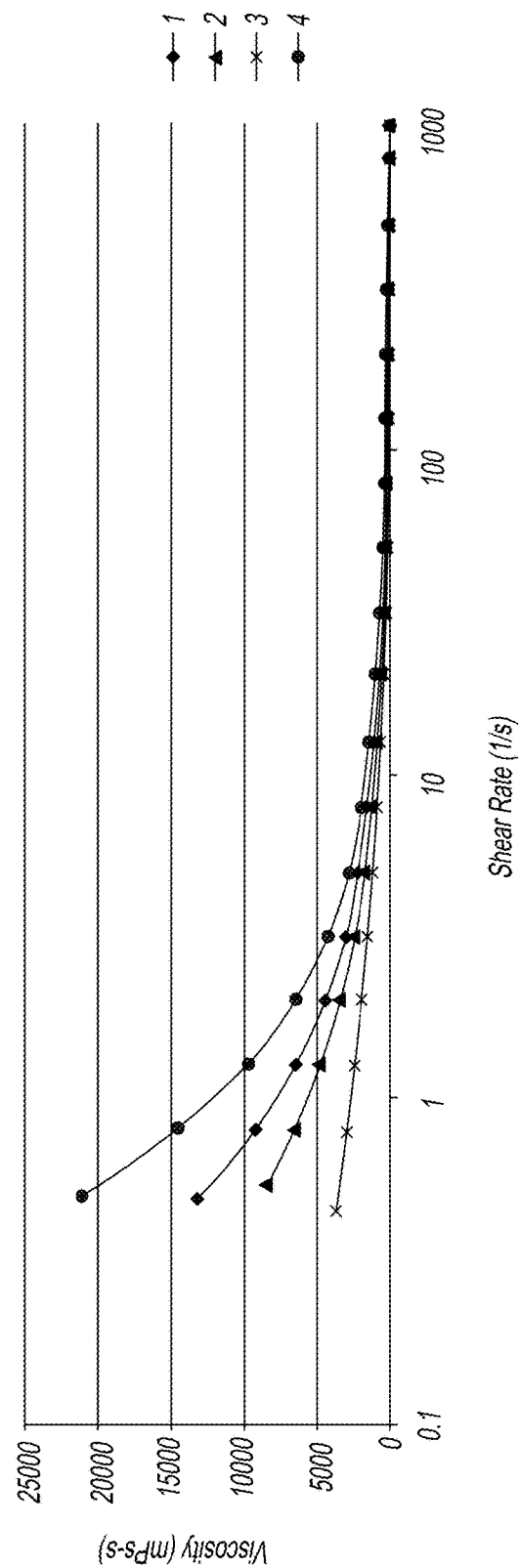
FIG. 3 depicts paint viscosities versus shear rate curves for four (4) typical paints.

FIG. 3 shows typical paint viscosities for two (2) different colors as supplied by manufacturers. The paint viscosities are shown against their shear rates. One can clearly see that for the same viscosity the shear rates are widely different for the four paints. This poses a serious issue for paint distribution system designers. In order to maintain a minimum velocity throughout the system and a specified pressure at the robots, the supply line pressures must be designed to accommodate these wide range of viscosities. For the prior art designs, the supply line and return line pressures for the four (4) colors are shown inn Table 1 below.

TABLE 1

| Color | Normalized Supply Pressure (psi) | Normalized Return Pressure (psi) |
| --- | --- | --- |
| Black | 100 | 3-5 |
| Blue | 150 | 5-7 |

As shown from the data in Table 1, there is a major difference between the supply line pressure and the return line pressure for all colors. Also, there are major differences between the supply line pressures for all individual colors. For paint distribution system designs, this means the pumps will have to be selected based on this wide variation. Further, some of these pressures are very high and can cause shear degradation.

The paint distribution system design of the present disclosure will not only reduce the supply line and return line pressure differentials, but importantly require lower pressures overall for the same range of paint viscosities in FIG. 3. This is set forth in Table 2 below.

TABLE 2

| Color | Normalized Supply Pressure (psi) | Normalized Return Pressure (psi) |
| --- | --- | --- |
| Black | 60 | 3-5 |
| Blue | 67 | 5-7 |

Lower supply line pressures mean reduced shear degradation and easier pump selection. These lower pressures are possible because of reduced tubing, reduction in the number of hoses, elimination of graduated piping and increased pipe and hose sizes in accordance with the present disclosure.

The foregoing description of embodiments and examples is presented for the purpose of illustration and description and is not meant to limit the present disclosure in any form. Many modifications are possible. For example, although the design is well suited for a piggable system, one can also use it for general cleaning systems, or a combination of piggable and non piggable piping. Also, while the preferred paint distribution system may be a three (3) pig tube system (see FIG. 5 showing three (3) piggable paint hoses 506 fluidly connecting to the paint color change valve assembly 510), the same concept can be extended to one (1) or two (2) pig tube designs.

Although the present disclosure is applicable to paints in particular, it can be applied to various liquids and chemicals.

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. A paint distribution system comprising:
at least one paint reservoir;
at least one paint exchange assembly, wherein each paint exchange assembly comprises at least one paint exchange module, wherein each paint exchange module comprises a plurality of paint exchange units;
a plurality of paint circulation lines disposed between each paint reservoir and each paint exchange module, wherein each paint circulation line supplies at least one colored paint from a paint reservoir to a paint exchange unit;
at least one paint color change valve module; and
at least one paint supply line disposed between each paint exchange module and each paint color change valve module, wherein each paint supply line supplies at least one colored paint from a paint exchange module to a paint color change valve module;
wherein each paint exchange module is configured such that the number of said paint supply lines disposed between a paint exchange module and a paint color change valve module is less than the number of paint circulation lines disposed between a paint reservoir and a paint exchange module.

2. The paint distribution system of claim 1 wherein the number of said paint supply lines disposed between each paint exchange module and each paint color change valve module is between about 1 to about 3, and wherein the number of paint circulation lines disposed between each paint reservoir and each paint exchange module is about 2 to about 100.

3. The paint distribution system of claim 1 further comprising at least one paint application assembly in fluid communication with each paint color change valve module.

4. The paint distribution system of claim 3 wherein each paint application assembly comprises at least one robot spray assembly, at least one manual spray assembly, or a combination thereof.

5. The paint distribution system of claim 1 further comprising at least one controller having an input that receives at least one input data signal, and an output that transmits at least one output data signal.

6. The paint distribution system of claim 5 wherein each input data signal and each output data signal are at least one parameter selected from the group consisting of: viscosity, flow rate, temperature and pressure values for the paint; and maintain the parameter within a predetermined range.

7. The paint distribution system of claim 1 wherein each paint supply line is piggable.

8. The paint distribution system of claim 1 wherein each paint exchange module includes at least one pig launcher and/or receiver assembly.

9. The paint distribution system of claim 1 further comprising at least one purge valve, at least one compressed air valve, and at least one dump valve.

10. The paint distribution system of claim 9 which utilizes a purge material comprising a mixture of air and solvent, or a mist of solvent created by blending air and solvent.

11. The paint distribution system of claim 1 wherein each paint exchange assembly comprises:
- at least one paint exchange module, wherein each paint exchange module comprises a plurality of paint exchange units, wherein each paint exchange unit comprises a housing, a paint circulation control valve, and at least one fluid conduit disposed within said housing, and wherein each fluid conduits from aligned paint exchange units are in fluid communication with one another, thereby forming a single fluid chamber in the paint exchange module;
- at least one paint circulation line inlet in fluid communication with the fluid chamber via the paint circulation control valve;
- at least one pig launcher and/or receiver assembly having at least one or more pigs;
- at least one purge material valve assembly in fluid communication with said fluid chamber;
- at least one compressed air valve assembly in fluid communication with said fluid chamber;
- at least one dump valve assembly in fluid communication with said fluid chamber; and
- at least one piggable paint supply hose in fluid communication with said fluid chamber and each pig launcher and/or receiver assembly, wherein said one or more pigs are capable of passing from each launcher and/or receiver assembly to each piggable paint supply hose.

12. A method for supplying a paint for coating of a workpiece, said method comprising:
a) providing a paint distribution system comprising:
- at least one paint reservoir;
- at least one paint exchange assembly, wherein each paint exchange assembly comprises at least one paint exchange module, wherein each paint exchange module comprises a plurality of paint exchange units;
- a plurality of paint circulation lines disposed between each paint reservoir and each paint exchange module, wherein each paint circulation line supplies at least one colored paint from a paint reservoir to a paint exchange unit;
- at least one paint color change valve module; and
- at least one paint supply line disposed between each paint exchange module and each paint color change valve module, wherein each paint supply line supplies at least one colored paint from a paint exchange module to a paint color change valve module;
- wherein each paint exchange module is configured such that the number of said paint supply lines disposed between a paint exchange module and a paint color change valve module is less than the number of paint circulation lines disposed between a paint reservoir and a paint exchange module;
b) circulating one or more colored paints through the paint distribution system; and
c) coating the workpiece with the one or more colored paints.

13. The method of claim 12 wherein the workpiece is an automotive part.

14. The method of claim 12 wherein, in the paint distribution system, the number of said paint supply lines disposed between each paint exchange module and each paint color change valve module is between about 1 to about 3, and wherein the number of paint circulation lines disposed between each paint reservoir and each paint exchange module is about 2 to about 100.

15. The method of claim 12 wherein the paint distribution system further comprises at least one paint application assembly in fluid communication with each paint color change valve module.

16. The method of claim 15 wherein each paint application assembly comprises at least one robot spray assembly, at least one manual spray assembly, or a combination thereof.

17. The method of claim 12 wherein the paint distribution system further comprises at least one controller having an input that receives at least one input data signal, and an output that transmits at least one output data signal.

18. The method of claim 17 wherein each input data signal and each output data signal are at least one parameter selected from the group consisting of: viscosity, flow rate, temperature and pressure values for the paint; and maintain the parameter within a predetermined range.

19. The method of claim 12 wherein, in the paint distribution system, each paint supply line is piggable.

20. The method of claim 12 wherein, in the paint distribution system, each paint exchange module includes at least one pig launcher and/or receiver assembly.

21. The method of claim 12 wherein the paint distribution system further comprises at least one purge valve, at least one compressed air valve, and at least one dump valve.

22. The method of claim 21 wherein the paint distribution system utilizes a purge material comprising a mixture of air and solvent, or a mist of solvent created by blending air and solvent.

23. The method of claim 12 wherein, in the paint distribution system,
- each paint exchange unit comprises a housing, a paint circulation control valve, and at least one fluid conduit disposed within said housing, and wherein each fluid conduits from aligned paint exchange units are in fluid communication with one another, thereby forming a single fluid chamber in the paint exchange module; and wherein each paint exchange assembly further comprises:
- at least one paint circulation line inlet in fluid communication with the fluid chamber via the paint circulation control valve;
- at least one pig launcher and/or receiver assembly having at least one or more pigs;
- at least one purge material valve assembly in fluid communication with said fluid chamber;
- at least one compressed air valve assembly in fluid communication with said fluid chamber;
- at least one dump valve assembly in fluid communication with said fluid chamber; and
- at least one piggable paint supply hose in fluid communication with said fluid chamber and said pig launcher and/or receiver assembly, wherein said one or more pigs are capable of passing from each pig launcher and/or receiver assembly to each piggable paint supply hose.

24. An integrated paint distribution system comprising a first paint distribution system integrated with a second paint distribution system, wherein said first paint distribution system comprises:
- at least one paint reservoir;
- at least one paint exchange assembly, wherein each paint exchange assembly comprises at least one paint exchange module, wherein each paint exchange module comprises a plurality of paint exchange units;
- a plurality of paint circulation lines disposed between each paint reservoir and each paint exchange module, wherein each paint circulation line supplies at least one colored paint from a paint reservoir to a paint exchange unit;

at least one paint color change valve module; and at least one paint supply line disposed between each paint exchange module and each paint color change valve module, wherein each paint supply line supplies at least one colored paint from a paint exchange module to a paint color change valve module;

wherein each paint exchange module is configured such that the number of said paint supply lines disposed between a paint exchange module and a paint color change valve module is less than the number of paint circulation lines disposed between a paint reservoir and a paint exchange module; and wherein said second paint distribution system comprises:

at least one paint reservoir;

at least one spray station paint assembly;

a plurality of paint circulation lines disposed between each paint reservoir and each spray station paint assembly;

at least one paint color change assembly; and a plurality of paint supply lines disposed between each spray station paint assembly and each paint color change assembly;

wherein each spray station paint assembly is configured such that the number of paint supply lines disposed between a spray station paint assembly and a paint color change assembly is equal to the number of paint circulation lines disposed between a paint reservoir and a spray station paint assembly.

25. The integrated paint distribution system of claim 24 wherein, in the first paint distribution system, each paint exchange unit comprises a housing, a paint circulation control valve, and a fluid conduit disposed within said housing, and wherein the fluid conduits from aligned paint exchange units are in fluid communication with one another, thereby forming a single fluid chamber in the paint exchange module; and wherein each paint exchange assembly further comprises:

at least one paint circulation line inlet in fluid communication with the fluid chamber via the paint circulation control valve;

at least one pig launcher and/or receiver assembly having at least one or more pigs;

at least one purge material valve assembly in fluid communication with said fluid chamber;

at least one compressed air valve assembly in fluid communication with said fluid chamber;

at least one dump valve assembly in fluid communication with said fluid chamber; and at least one piggable paint supply hose in fluid communication with said fluid chamber and each pig launcher and/or receiver assembly, wherein said one or more pigs are capable of passing from each pig launcher and/or receiver assembly to each piggable paint supply hose.

\* \* \* \* \*